(12) United States Patent
Haas et al.

(10) Patent No.: US 9,872,503 B2
(45) Date of Patent: Jan. 23, 2018

(54) MACHINE FOR PRODUCING ROLLED WAFER CONES

(71) Applicant: HAAS FOOD EQUIPMENT GMBH, Vienna (AT)

(72) Inventors: Johannes Haas, Vienna (AT); Josef Haas, Leobendorf (AT); Stefan Jiraschek, Koenigsbrunn (AT); Gottfried Stilling, Vienna (AT)

(73) Assignee: Haas Food Equipment GmbH, Vienna (AT)

( * ) Notice: Subject to any disclaimer, the term of this patent is extended or adjusted under 35 U.S.C. 154(b) by 166 days.

(21) Appl. No.: 14/908,750

(22) PCT Filed: Jul. 22, 2014

(86) PCT No.: PCT/EP2014/065701
§ 371 (c)(1),
(2) Date: Jan. 29, 2016

(87) PCT Pub. No.: WO2015/014665
PCT Pub. Date: Feb. 5, 2015

(65) Prior Publication Data
US 2016/0165900 A1 Jun. 16, 2016

(30) Foreign Application Priority Data
Jul. 29, 2013 (AT) ................. A606/2013

(51) Int. Cl.
*A21C 15/02* (2006.01)
*A21B 5/02* (2006.01)

(52) U.S. Cl.
CPC ............ *A21C 15/025* (2013.01); *A21B 5/026* (2013.01)

(58) Field of Classification Search
CPC ..................... A21C 15/025; A21B 5/026
See application file for complete search history.

(56) References Cited

U.S. PATENT DOCUMENTS

| | | | |
|---|---|---|---|
| 1,804,039 A | * | 5/1931 | Tatosian ............... A21C 15/025 425/317 |
| 3,269,335 A | | 8/1966 | Heyman |

(Continued)

FOREIGN PATENT DOCUMENTS

| AT | 410390 B | 4/2003 |
|---|---|---|
| DE | 202004019511 U1 | 4/2005 |

*Primary Examiner* — James Mackey
(74) *Attorney, Agent, or Firm* — Laurence A. Greenberg; Werner H. Stemer; Ralph E. Locher

(57) ABSTRACT

A machine with horizontally oriented cone-rolling devices produces rolled wafer cones. The cone-rolling devices are arranged one behind the other along a circulatory path in an elongate machine framework and are conveyed along the circulatory path, by an endless conveyor, from an infeed station to the delivery station of the machine. Each cone-rolling device has a rolling mold connected rigidly to the carrying frame of the device, a cone stripper, which can be displaced along the carrying frame, and a rolling mandrel, which can be displaced along the carrying frame. The rolling mold is arranged on a lateral end portion of the carrying frame, the cone stripper is arranged on a first carriage, which can be displaced along the carrying frame, and the rolling mandrel is arranged on a second carriage, which can be displaced along the carrying frame.

13 Claims, 13 Drawing Sheets

(56) References Cited

U.S. PATENT DOCUMENTS

| | | | |
|---|---|---|---|
| 4,694,741 A * | 9/1987 | Haas, Sr. ............... | A21B 5/026 |
| | | | 425/322 |
| 6,227,103 B1 | 5/2001 | Haas Sen et al. | |
| 7,344,371 B2 * | 3/2008 | Shinomiya ............. | A21B 5/026 |
| | | | 425/348 R |

* cited by examiner

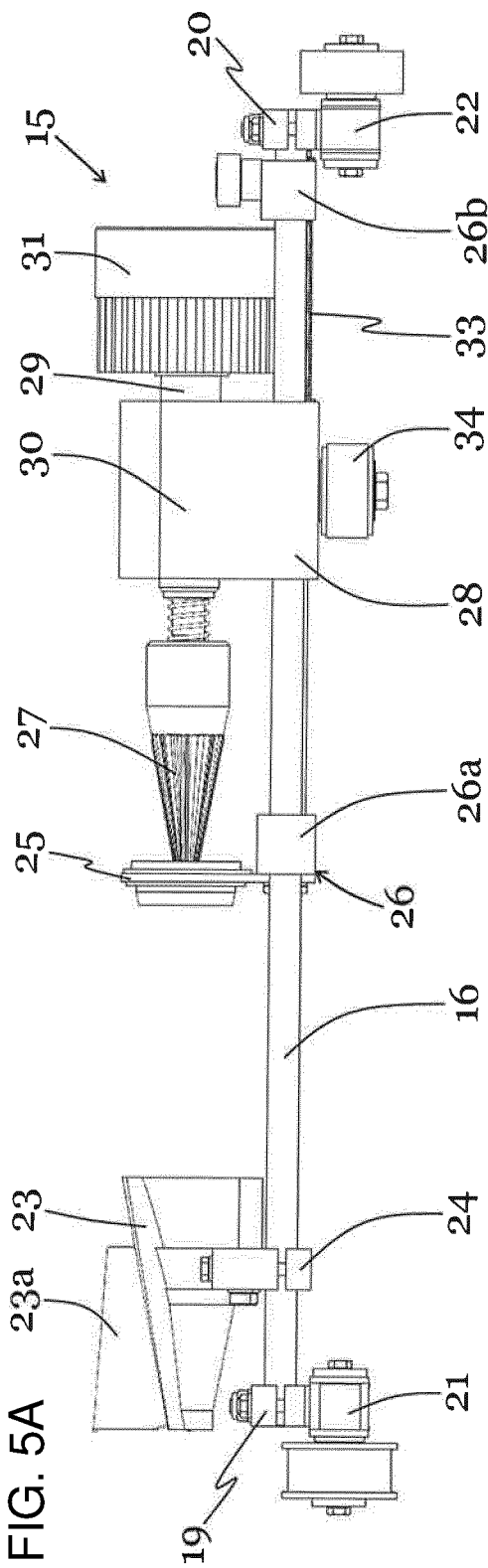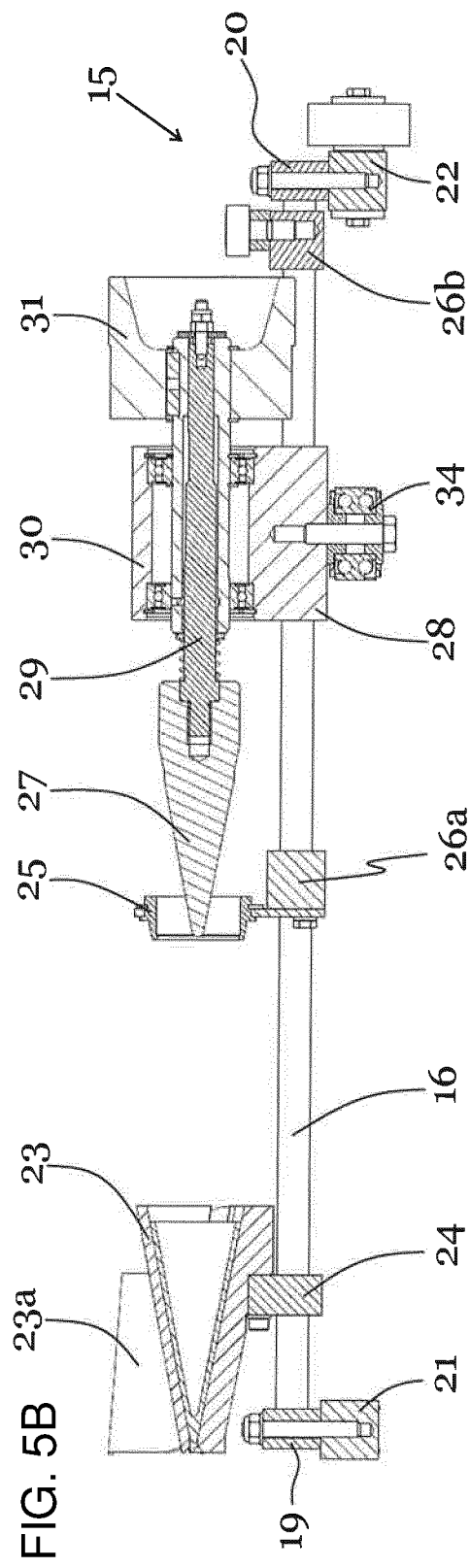

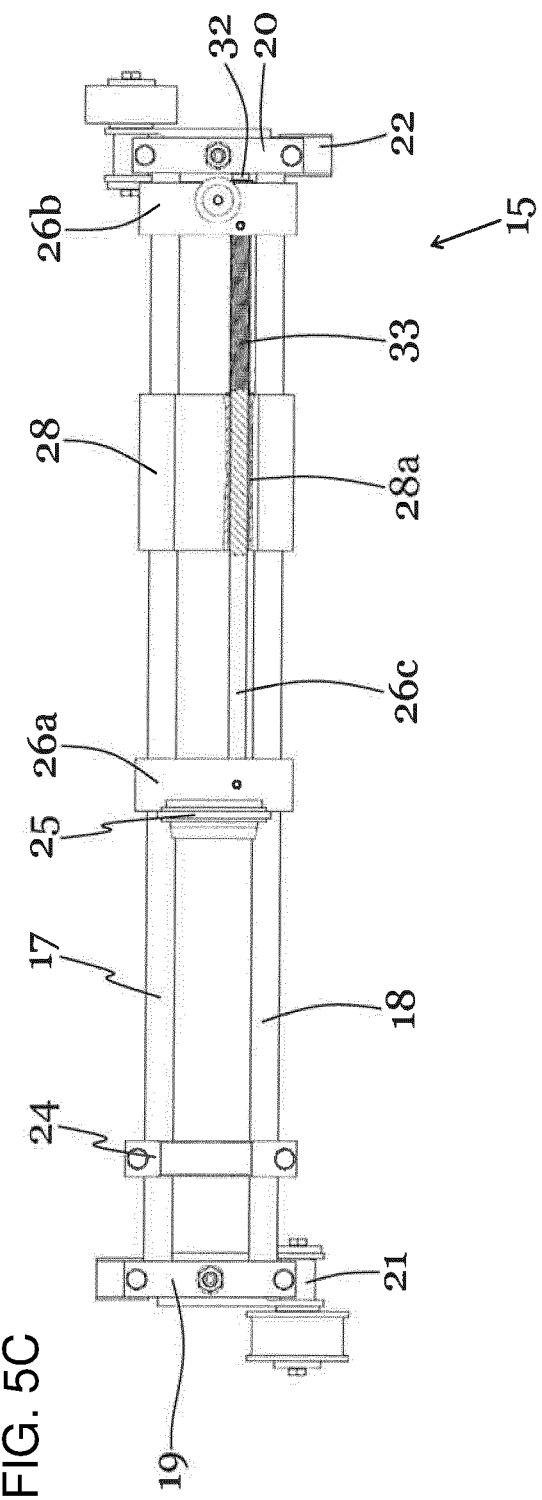
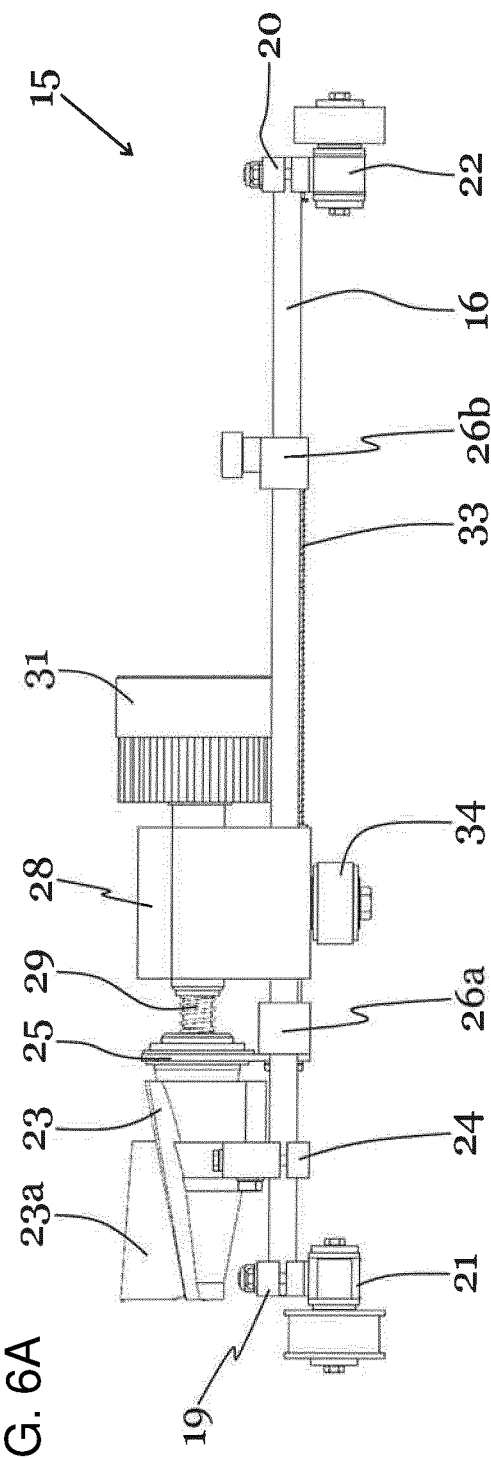
FIG. 5C
FIG. 6A

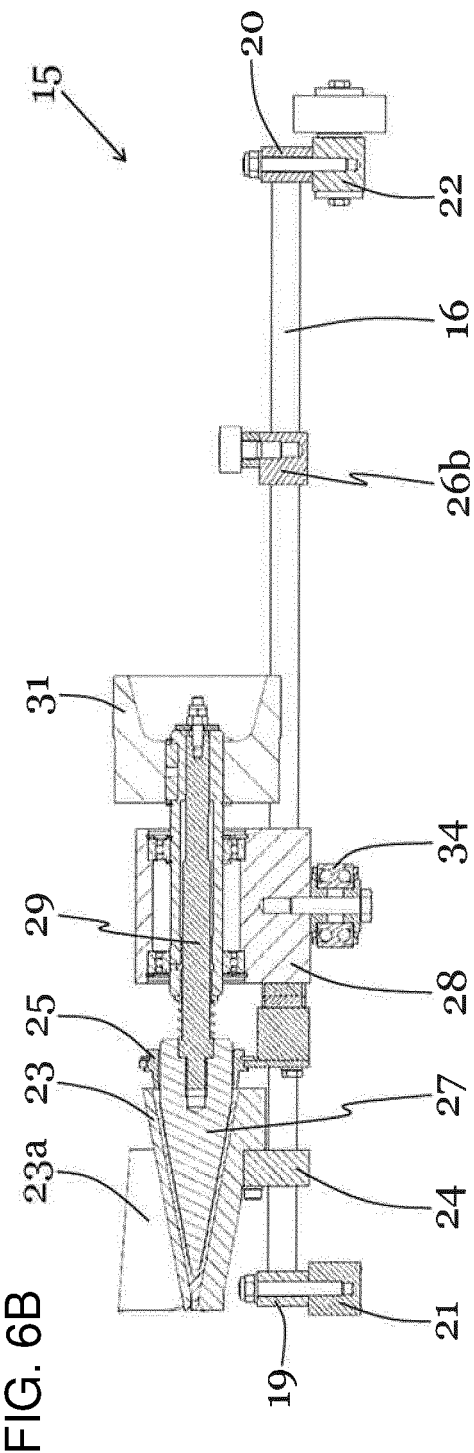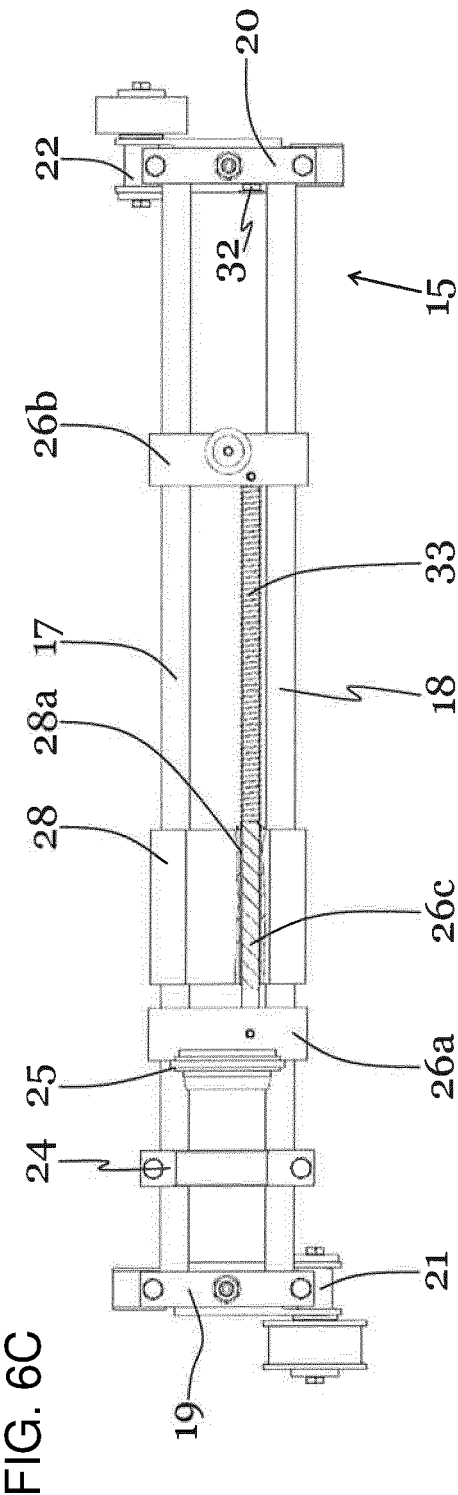
FIG. 6B
FIG. 6C

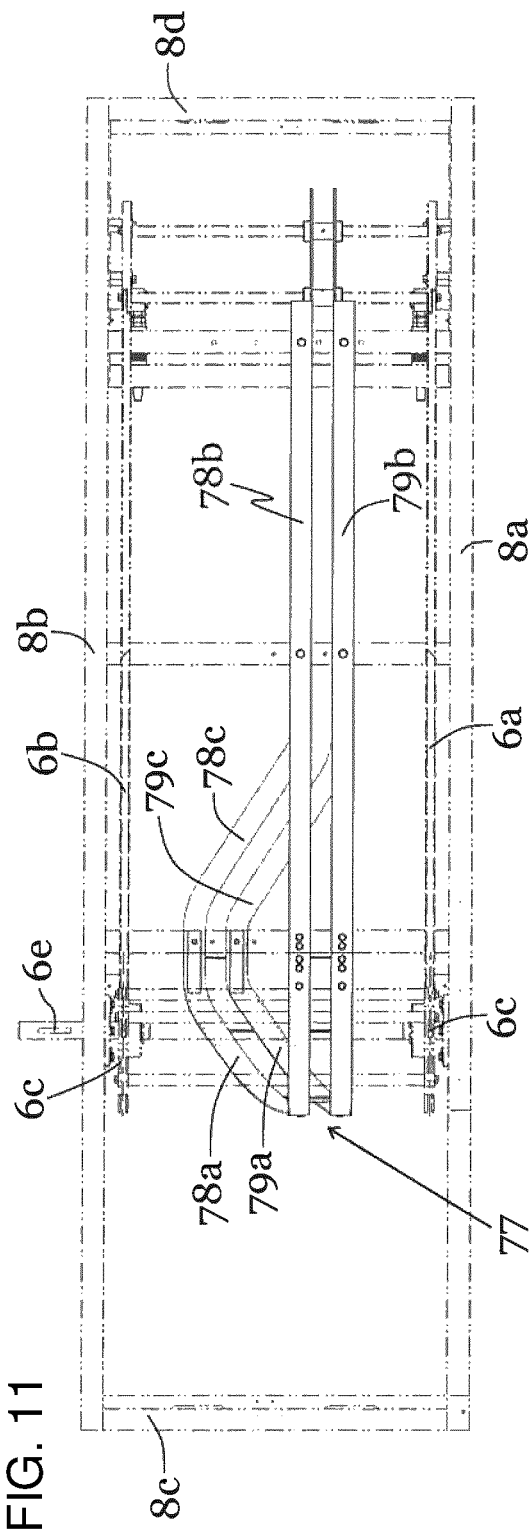
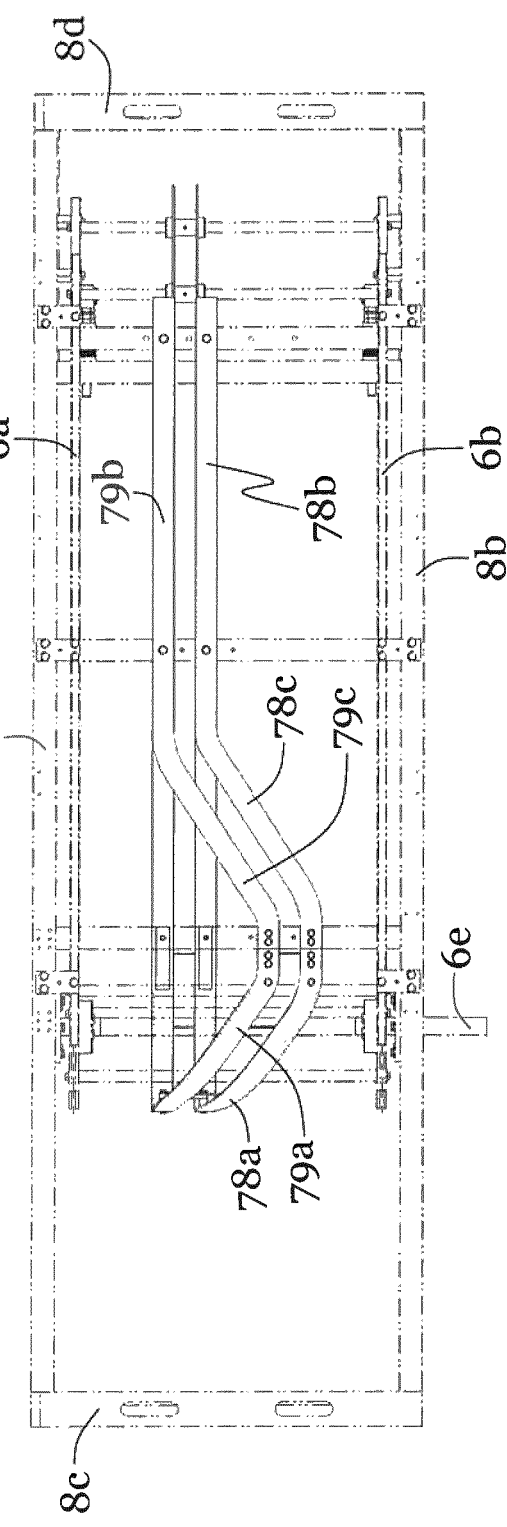
FIG. 11
FIG. 12

MACHINE FOR PRODUCING ROLLED WAFER CONES

BACKGROUND OF THE INVENTION

Field of the Invention

The invention relates to a machine for producing rolled wafer cones. The rolled wafer cones are produced in the horizontally aligned cone rolling devices of the machine. The machine has an elongate machine frame in which the cone rolling devices are disposed consecutively along a circumferential path extending in the longitudinal direction of the machine frame. The machine has an endless conveyor which is disposed along the circumferential path and which supports the cone rolling device, which conveys the cone rolling devices along the circumferential path from the input station disposed on the machine upper side to the discharge station disposed on the machine lower side. The endless conveyor has transport chains disposed on the lateral edges of the circumferential path to which the supporting frames of the cone rolling devices are affixed.

Such machines are known, for example, from AT 410 309 B and U.S. Pat. No. 6,227,103 B1.

Rolled wafer cones are made from flat wafer cakes. The baked wafer cakes are plastically deformable in the baked hot state. During cooling to room temperature, the wafer cakes solidify to form dimensionally stable crispy-brittle structures. The wafer cakes are introduced in the hot plastically deformable state into the cone rolling devices and rolled into cones in the cone rolling devices. The finished, hot and still plastically deformable cones are output from the cone rolling devices. During cooling to room temperature the cones solidify into dimensionally stable crispy-brittle structures.

BRIEF SUMMARY OF THE INVENTION

The invention provides a new machine of the type mentioned initially. The new machine is characterized according to the invention in that each cone rolling device has a rolling mold rigidly connected to the supporting frame thereof, a cone scraper which is displaceable along the supporting frame thereof and a rolling mandrel which is displaceable along the supporting frame thereof, wherein the rolling mold is disposed on a lateral end section of the supporting frame, the cone scraper is disposed on a first carriage which is displaceable along the supporting frame and the rolling mandrel is disposed on a second carriage which is displaceable along the supporting frame.

The machine according to the invention provides horizontally aligned cone rolling devices. These have horizontally aligned supporting frames to which the horizontally aligned rolling molds are rigidly connected. The supporting frames extend in the transverse direction of the machine frame and are fastened to the lateral edges of the circumferential orbit on the transport chains of the endless conveyor. In each cone rolling device the rolling mold rigidly connected to the supporting frame is horizontally aligned and disposed transversely to the circumferential direction of the cone rolling devices. As a result, the rolling molds disposed immovably in the cone rolling devices are always located in the same receiving position for the wafer cakes when passing the input station. As a result of the rolling molds disposed immovably in the cone rolling devices, alignment errors of the wafer cakes with respect to the rolling molds during insertion of the wafer cakes into the rolling molds are avoided.

Each cone rolling device contains a rolling unit disposed in the supporting frame, which can be pulled apart in the longitudinal direction of the supporting frame and which can be pushed together in the longitudinal direction of the supporting frame. The rolling unit consists of a horizontally aligned rolling mold which is rigidly connected to the supporting frame, of the cone scraper which is displaceable in the supporting frame, which is disposed on a first carriage which is displaceable in the longitudinal direction of the supporting frame and of the horizontally aligned rolling mandrel which is displaceable in the supporting frame, which is disposed on a second carriage which is displaceable in the longitudinal direction of the supporting frame. The rolling unit is pushed together or pulled apart by displacement of the two carriages in the longitudinal direction of the supporting frame.

The endless conveyor conveys the cone rolling devices along the circumferential path from the input station to the output station and back again to the input station. On the way from the output station to the input station, the rolling units in the cone rolling devices are pushed together in the longitudinal direction or closed. In the input station in each cone rolling device, a hot wafer cake is introduced into the closed rolling unit and rolled in this between rolling mold and rolling mandrel to form a cone. During transport of the cone rolling devices from the input station to the output station, the rolling units remain closed. In the output station at each cone rolling device the rolling unit is pulled apart in the longitudinal direction with the aid of the two carriages and the cone is output from the rolling unit. In this case, firstly the rolling mandrel with the cone disposed thereon is pulled out from the rolling mold and the cone scraper is pushed backwards together with the rolling mandrel. Then the cone is scraped from the rolling mandrel by the cone scraper. For scraping the cone the first carriage is pushed forwards with respect to the second carriage or the second carriage is pushed backwards with respect to the first carriage.

According to a further feature of the invention, it can be provided that a rolling mandrel shaft rotatably mounted in a bearing block on the second carriage is provided which carries the rolling mandrel at the front end and a rolling mandrel drive wheel at the rear end.

In this embodiment, the rolling mandrel is set in rotation by means of the rolling mandrel drive wheel. The rolling mandrel drive wheel is driven by a drive device disposed on the circumferential path of the cone rolling devices with which the rolling mandrel drive wheels of the cone rolling devices come into engagement when the cone rolling devices are conveyed in the longitudinal direction of the machine to the input station and through the input station.

According to a further feature of the invention, it can be provided that the rolling mandrel shaft is configured as a rolling mandrel shaft which can be pushed together axially into itself, wherein the rolling mandrel shaft comprises an outer sleeve which is mounted rotatably but axially non-displaceably in the bearing block, and which carries the rolling mandrel drive wheel, an inner shaft which is axially displaceable in the outer sleeve and which carries the rolling mandrel, and a polygonal coupling which mechanically connects the outer sleeve with the inner shaft.

This embodiment of the cone rolling devices is advantageous in the manufacture of rolled wafer cones in which the parts of the wafer cakes placed one upon the other during the rolling process lead to an increase in the wall thickness of the cone formed. The rolling mandrel must take into account this increase in wall thickness with an axial backwards movement. In this embodiment of the cone rolling devices a backward movement of the second carriage which produces a backward movement of the rolling mandrel is not required. In this embodiment of the cone rolling devices the rolling mandrel shaft which can be pushed together axially into itself takes up the axial backward movement of the rolling mandrel. During rolling in of the wafer cake, an increase in the wall thickness of the cone being formed occurs in the rolling mold. As a result of this increase in wall thickness, the rolling mandrel is pushed axially back. As a result, the rolling mandrel shaft is pushed together axially and in the polygonal coupling the two coupling sections are displaced axially with respect to one another. The torque introduced by the rolling mandrel drive wheel into the rolling mandrel shaft is transmitted unchanged during the axial displacement of the two coupling sections of the polygonal coupling via the polygonal coupling to the inner shaft of the rolling mandrel shaft which carries the rolling mandrel.

According to a further feature of the invention, it can be provided that the polygonal coupling is disposed in the rear part of the rolling mandrel shaft, wherein an inner coupling section formed by the inner shaft, which is formed on the outer side as a polygonal shaft is received positively in an outer coupling section formed by the outer sleeve, which is formed on the inner side of the polygonal sleeve.

In this embodiment the rolling mandrel drive wheel disposed at the rear end of the rolling mandrel shaft can be disposed directly above the polygonal coupling. The rolling mandrel drive wheel then sits on the outer coupling section of the polygonal coupling. The torque introduced by the rolling mandrel drive wheel into the rolling mandrel shaft is transferred in this polygonal coupling from the outer coupling section to the inner coupling section received positively therein, which is disposed on the rear end of the inner shaft carrying the rolling mandrel.

According to a further feature of the invention, the rolling mandrel can be supported resiliently on the second carriage.

This embodiment enables the rolling mandrel to be pressed resiliently against the wafer cake rolled in the rolling mold during the rolling process with a predefined spring pressure. Another advantage is that after the rolling process the rolling mandrel automatically returns to its initial position as a result of the spring pressure.

The rolling mandrel can be supported resiliently by means of a helical spring on the outer sleeve of the rolling mandrel shaft. The helical spring can be disposed between the rear side of the rolling mandrel and the front end of the outer sleeve of the rolling mandrel shaft. The helical spring can be disposed between the front end section of the inner shaft carrying the rolling mandrel and the front end of the outer sleeve of the rolling mandrel shaft.

According to a further feature of the invention, it can be provided that the second carriage carrying the rolling mandrel is provided with an entrainer which can be brought into engagement with a guide device disposed along the circumferential path in the machine frame, which together with the entrainer controls the position of the second carriage in the cone rolling device.

The guide device disposed in the machine frame determines the position of the second carriage inside the cone rolling device by means of the entrainer attached to the second carriage and together with the entrainer produces the carriage movement of the second carriage running in the transverse direction of the machine frame for pulling apart or pushing together the rolling unit of the cone rolling device.

According to a further feature of the invention, it can be provided that the guide device disposed in the machine frame provides two guide rails parallel to one another, between which the entrainer attached to the second carriage is disposed, that a guide section mounted in front of the input station is provided, which is provided with obliquely running guide rails in the machine frame, which together with the entrainer attached to the second carriage produces a forwards movement of the second carriage which introduces the rolling mandrel into the rolling mold, and that a guide section disposed in the area of the output station is provided, which is provided with guide rails running obliquely in the machine frame which together with the entrainer attached to the second carriage produces a backwards movement of the second carriage which withdraws the rolling mandrel from the rolling mold.

In the cone rolling devices according to a further feature of the invention, it can be provided that a first carriage which can be moved passively with the second carriage is provided, that the first carriage has a front carriage part which is disposed in front of the second carriage and which carries the cone scraper and a rear carriage part disposed behind the second carriage, that in the first carriage the front carriage part is disposed at a distance from the rear carriage part and is rigidly connected to this by a spacer rod, that the first carriage is coupled to the second carriage by a helical spring disposed behind the second carriage and that at the rear end of the supporting frame a stop delimiting the displacement path of the first carriage is disposed.

In this embodiment the first carriage coupled to the second carriage by the helical spring is entrained by a small amount in each case during the forward movement and during the backward movement of the second carriage. For pulling apart and pushing together the rolling unit, only the second carriage is pushed to and fro in the supporting frame of the cone rolling device.

When the rolling unit is pushed together, both carriages are each located in the front end position. The cone scraper is located directly in front of the rolling mold. The rolling mandrel penetrates through the cone scraper into the rolling mold. The second carriage abuts against the rear side of the front carriage part at the first carriage. The spacer rod of the first carriage projects to the rear beyond the rear side of the second carriage. The rear carriage part of the first carriage is located at a distance between the second carriage. The helical spring which couples the first carriage to the second carriage is located between the second carriage and the rear carriage part of the first carriage. The helical spring presses the first carriage in the supporting frame towards the rear and the front carriage part of the first carriage against the front side of the second carriage.

For pulling apart the rolling unit the second carriage is pushed to the rear from its front end position and displaced into its rear end position.

In the first part of the backwards movement of the second carriage the first carriage is also pushed to the rear. In so doing the rolling mandrel together with the cone located thereon is pulled out axially from the rolling mold and the cone scraper located behind the cone is pushed towards the rear together with the rolling mandrel away from the rolling mold. At the end of the backwards movement of the second carriage, the first carriage is located in its rear end position. The first carriage abuts with its rear carriage part against the stop located at the rear end of the supporting frame.

In the second part of the backwards movement of the second carriage, the first carriage is located in its rear end position and does not move. The second carriage is pushed further back in the supporting frame and the coupling with the first carriage produced by the helical spring is released or cancelled. The second carriage is pushed backwards away from the front carriage part of the first carriage. The helical spring located between the second carriage and the rear carriage part of the first carriage is compressed axially. The rolling mandrel located on the second carriage is pulled towards the rear through the cone scraper and the cone located on the rolling mandrel is scraped from the rolling mandrel.

For pushing together the rolling unit the second carriage is pushed to the front from its rear end position and displaced into its front end position.

In the first part of the forward movement of the second carriage, the first carriage is located in its rear end position and does not move. The second carriage is pushed forwards towards the front carriage part of the first carriage. In so doing the rolling mandrel is pushed towards the front through the cone scraper and the helical spring extends. In the second part of the forward movement of the second carriage, the first carriage is also pushed towards the front. In so doing the rolling mandrel and the cone scraper located behind the rolling mandrel are pushed forwards and the rolling mandrel is pushed into the rolling mold.

According to a further feature of the invention, it can be provided that a first carriage which can be moved passively with the second carriage is provided, that the first carriage has a front carriage part which is disposed in front of the second carriage and which carries the cone scraper and a rear carriage part disposed behind the second carriage, that in the first carriage the front carriage part is disposed at a distance from the rear carriage part and is rigidly connected to this by a spacer rod, that the first carriage is coupled to the second carriage by means of a detachable binding member and that at the rear end of the supporting frame a stop delimiting the displacement path of the first carriage is disposed.

In this embodiment the first carriage coupled to the second carriage by the detachable binding member is in each case entrained by a small amount during the forwards movement and during the backwards movement of the second carriage. For pulling apart and pushing together the rolling unit, only the second carriage is pushed to and fro in the supporting frame of the cone rolling device.

For pulling apart the rolling unit the second carriage is pushed to the rear away from the rolling mold and displaced into its rear end position.

In the first part of the backwards movement of the second carriage the first carriage coupled to the second carriage by the binding member is also pushed to the rear. In so doing the rolling mandrel carrying a cone is pulled out completely from the rolling mold and the cone scraper located behind the cone is pushed towards the rear together with the rolling mandrel away from the rolling mold. At the end of the first part of the backwards movement of the second carriage, the first carriage abuts with its rear carriage part against the stop located at the rear end of the supporting frame. As a result, the backwards movement of the first carriage is stopped.

In the second part of the backwards movement of the second carriage, the first carriage is located with its rear carriage part on the stop located at the rear end of the supporting frame and does not move. The second carriage is pushed further back in the supporting frame and the binding member is released by the backwards movement of the second carriage. Only the second carriage moves backwards. The rolling mandrel located on the second carriage is pulled backwards through the cone scraper and the cone located on the rolling mandrel is scraped from the rolling mandrel.

For pushing together the rolling unit the second carriage is pushed forwards in the supporting frame of the cone rolling device. The second carriage is pushed to the front from its rear end position into its front end position.

In the first part of the forward movement of the second carriage, the first carriage is located in its rear end position and does not move. The second carriage is pushed forwards towards the front carriage part of the first carriage. In so doing the rolling mandrel is pushed towards the front through the cone scraper. In the second part of the forward movement of the second carriage, the first carriage is also pushed towards the front. In so doing the rolling mandrel and the cone scraper located behind the rolling mandrel are pushed forwards and the rolling mandrel is pushed into the rolling mold.

According to a further feature of the invention, it can be provided that the first carriage is coupled to the second carriage by means of a detachable binding member, wherein the binding member consists of a magnet attached to the front side of the second carriage and a counterpiece attached to the rear side of the front carriage part of the first carriage.

BRIEF DESCRIPTION OF THE SEVERAL VIEWS OF THE DRAWING

The invention will be explained in detail hereinafter with reference to the drawings. In the drawings:

FIG. 5 shows a cone rolling device with pulled-apart rolling unit, in FIG. 5a from the side, in FIG. 5b in longitudinal section and in FIG. 5c from above, FIG. 6 shows the cone rolling device from FIG. 5 with closed rolling unit, in FIG. 6a from the side, in FIG. 6b in longitudinal section and in FIG. 6c from above.

FIG. 11 shows the machine frame from FIG. 10 from above and FIG. 12 shows the machine frame from FIG. 10 from below.

DESCRIPTION OF THE INVENTION

Figure 1:
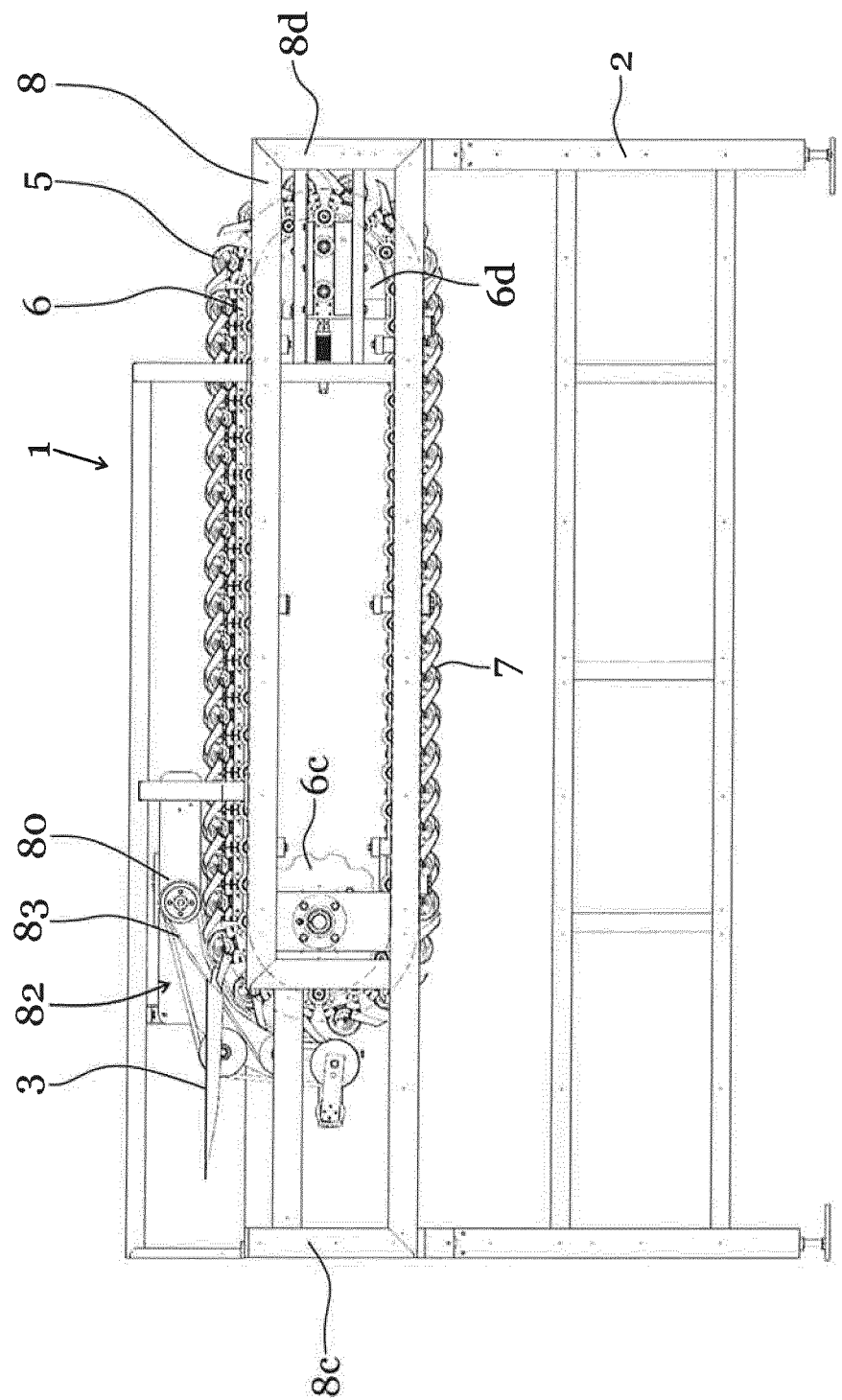
FIG. 1 shows a machine according to the invention in side view.

FIGS. 1-4 show a machine 1 for producing rolled wafer cones. The machine 1 is disposed on an underframe 2. A conveying device (not shown) which removes the wafer cones is disposed in the underframe 2.

The machine 1 has an input station 3 disposed on the upper side in which the wafer cakes 4 to be rolled are introduced into the cone rolling devices 5 circulating in the machine 1. The cone rolling devices 5 are disposed consecutively along a circumferential path extending in the longitudinal direction of the machine 1 and are moved by the endless conveyor 6 of the machine 1 along this circumferential path through the machine 1. The wafer cakes 4 are rolled into cones in the cone rolling devices 5. The rolled wafer cones formed in the cone rolling devices 5 are output at the output station 7 of the machine 1. The output station 7 is disposed on the underside of the machine 1. The wafer cones drop down from the machine 1 and onto the conveying device located in the underframe 2.

Figure 2:
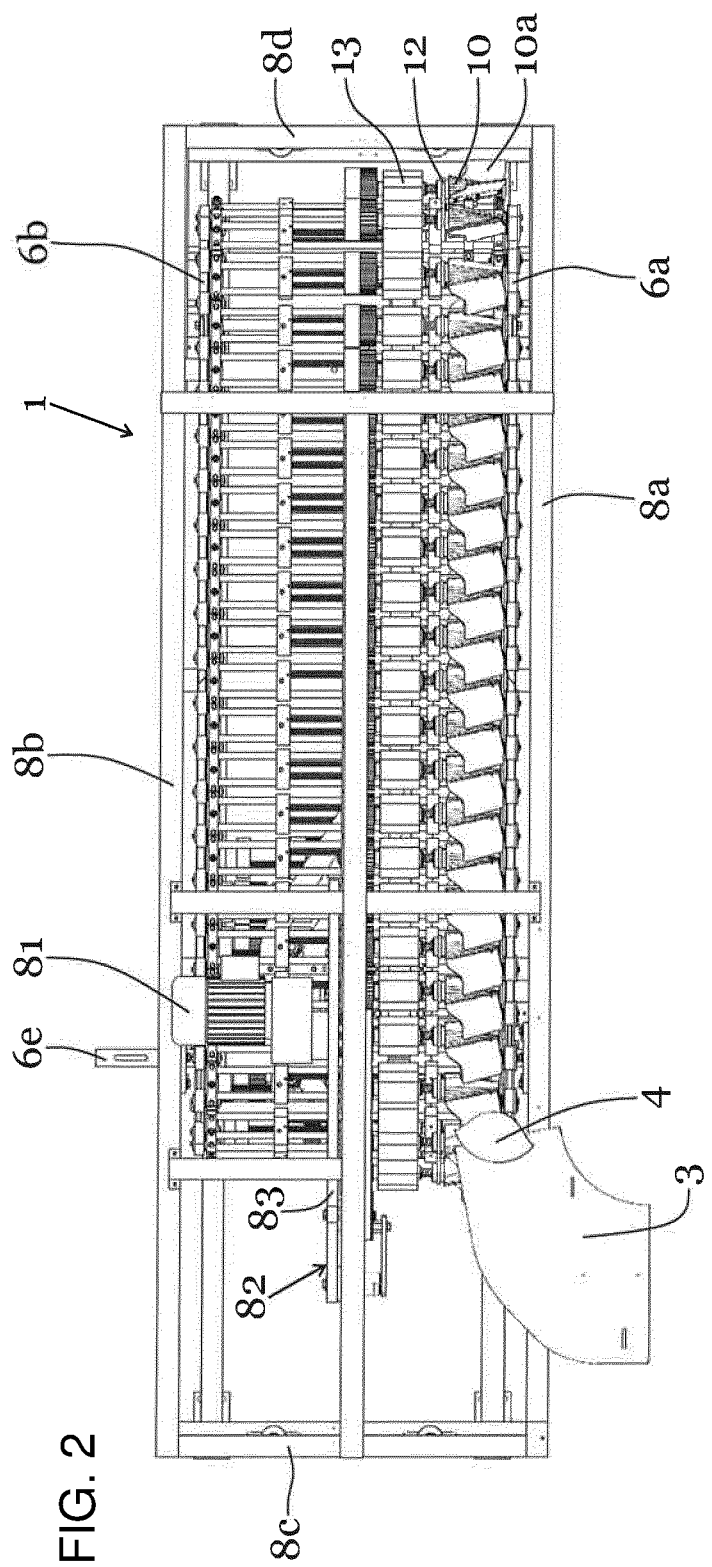
FIG. 2 shows the machine from FIG. 1 from above.
Figure 3:
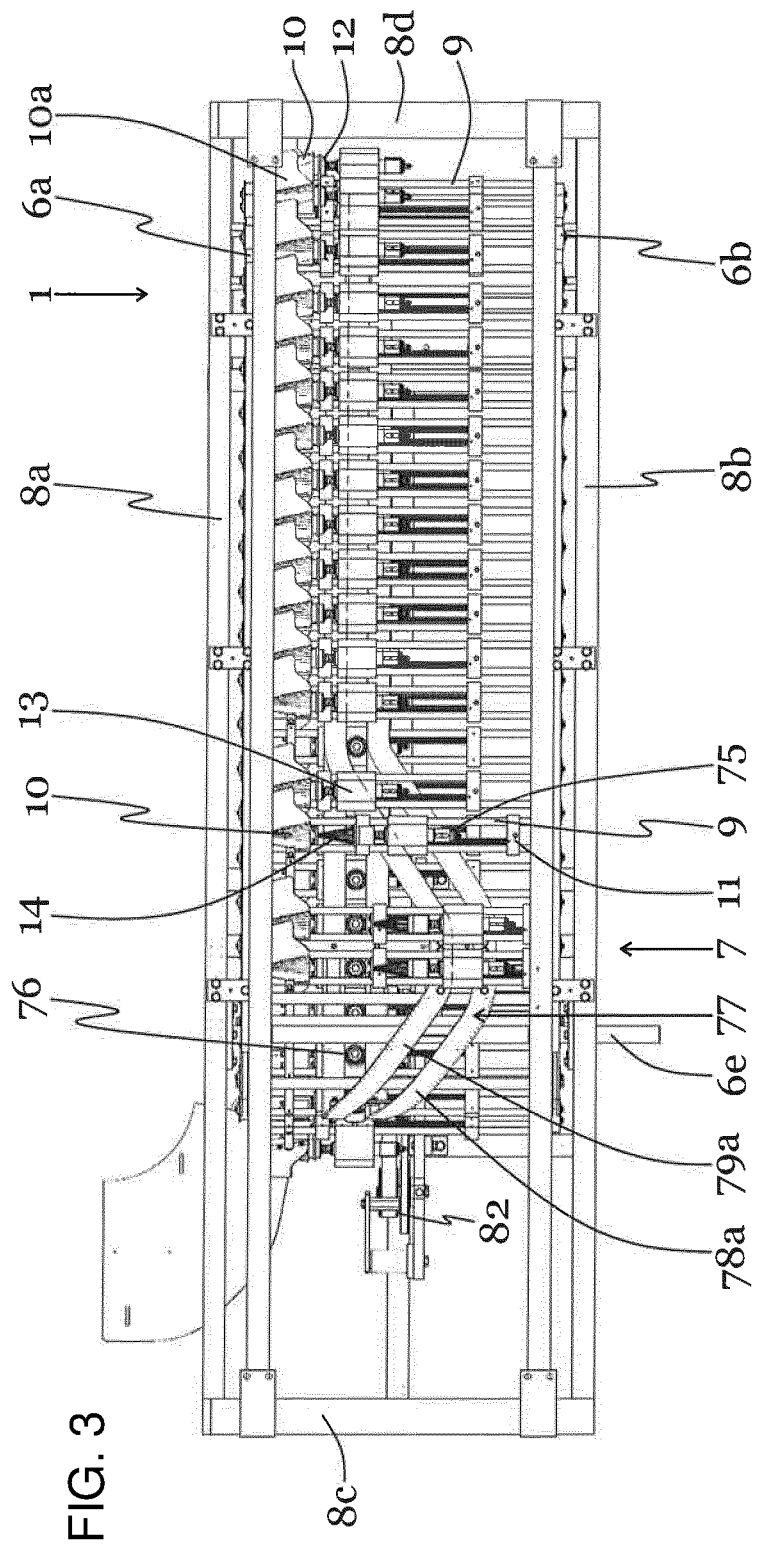
FIG. 3 shows the machine from FIG. 1 from below.
Figure 4:
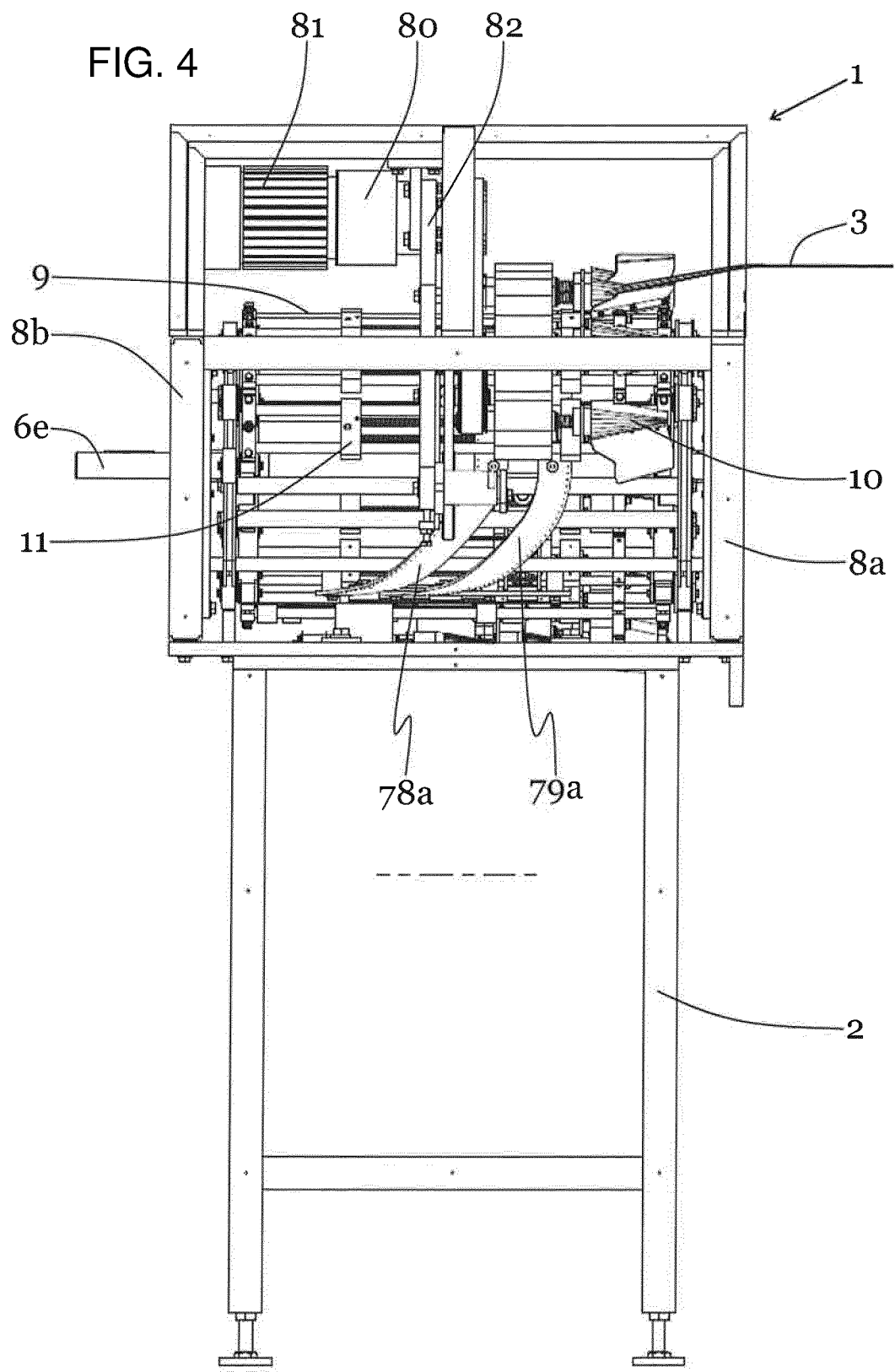
FIG. 4 shows a front view of the machine from FIG. 1.

The machine 1 has an elongate machine frame 8 with a front side wall 8a, a rear side wall 8b, a left end wall 8c and a right end wall 8d (FIG. 2). The machine frame 8 sits on the underframe 2.

The circumferential path of the cone rolling devices 5 is disposed in the machine frame 8. The circumferential path comprises two horizontal path sections located one above the other, extending in the longitudinal direction of the machine 1, which are interconnected by two semicircular path sections.

The cone rolling devices 5 are conveyed by the endless conveyor 6 in the longitudinal direction of the machine frame 8 through the circumferential path. The elongate cone rolling devices 5 are horizontally aligned and disposed transversely to the circumferential direction.

The endless conveyor 6 has two endless transport chains 6a, 6b which extend along the circumferential path and are disposed on both lateral edges of the circumferential path. The cone rolling devices 5 are disposed between the two transport chains 6a, 6b. The front ends of the cone rolling devices 5 are fastened to the front transport chain 6a which is located adjacent to the front side wall 8a of the machine frame 8. The rear ends of the cone rolling devices 5 are fastened to the rear transport chain 6b which is located adjacent to the rear side wall 8b of the machine frame 8.

The two transport chains 6a, 6b run over deflecting wheels 6c and 6d at the ends of the endless conveyor 6. The semicircular path sections of the circumferential path are located along these deflecting wheels 6c and 6d. The endless conveyor 6 is driven via the two chain deflecting wheels 6c located on its front end. The chain deflecting wheels 6c are connected via a horizontal drive shaft 6e to the drive motor (not shown) of the endless conveyor 6.

Each cone rolling device 5 has an elongate supporting frame 9 which extends in the transverse direction of the machine frame 8. The rolling mold 10 of the cone rolling device 5 is located adjacent to the front end of the supporting frame 9 and is rigidly connected to the supporting frame 9. The rolling mold 10 has a lateral insertion slot for the wafer cakes. Attached to the outer side of the rolling mold 10 is a sloping plate 10a on which the wafer cakes slide into the insertion slot. Located on the supporting frame 9 is a first carriage 11 which is displaceable along the supporting frame 9, which carries the cone scraper 12 of the cone rolling device 5. A second carriage 13 which is displaceable along the supporting frame 9, which carries the rolling mandrel 14 of the cone rolling device 5 is located on the supporting frame 9.

The rolling mold 10 connected rigidly to the supporting frame 9 together with the cone scraper 12 located on the first carriage 11 and together with the rolling mandrel 14 located on the second carriage 13 forms the rolling unit of the cone rolling device 5.

The rolling unit is pushed together or closed in the longitudinal direction of the supporting frame 9 in order to be able to roll a wafer cake into a cone in the closed rolling unit. To this end the two carriages 11 and 13 are pushed towards the rolling mold 10 rigidly connected to the supporting frame 9.

With the rolling unit closed, a wafer cake is introduced into the rolling mold 10. The wafer cake is introduced via the sloping plate 10a into the lateral insertion slot of the rolling mold 10. The wafer cake is introduced into the cavity disposed between the conical inner side of the rolling mold 10 and the conical outer side of the rolling mold 14 and rolled in this cavity to form a cone.

For outputting the cone from the closed rolling unit, the rolling unit is pulled apart in the longitudinal direction of the supporting frame 9. In this case, the rolling mandrel 14 together with cone is first withdrawn from the rolling mandrel 10. The cone is then scraped from the rolling mandrel 14 by the cone scraper 12. For withdrawing the cone from the rolling mold 10 both carriages 11, 13 are pushed away from the rolling mold 10. The scraping of the cone is accomplished during a relative movement of the two carriages 11, 13. After outputting the cone, the rolling unit is again pushed together or closed in the longitudinal direction of the supporting frame 9.

The cone rolling device 5 is conveyed with closed rolling unit to the input station 3 of the machine 1. At the input station 3 a wafer cake is introduced into the rolling mold 10 and rolled into a cone. The cone rolling device 5 is conveyed with closed rolling unit through the upper horizontal path section of the circumferential path (FIG. 1). At the rear end of the endless conveyor 6 the cone rolling device 5 with closed rolling unit is conveyed through the rear semicircular path section of the circumferential path into the lower horizontal path section of the circumferential path. On passing the output station 7, the rolling unit of the cone rolling device 5 is initially pulled apart in the longitudinal direction of the supporting frame 9 and then pushed together again in the longitudinal direction of the supporting frame 9 (FIG. 2). During the pulling apart of the rolling unit the cone is output from the cone rolling device 5.

FIG. 5 shows an elongate, horizontally aligned cone rolling device 15 with a rolling unit pulled apart in the longitudinal direction. FIG. 6 shows the cone rolling device 15 with rolling unit pushed together in the longitudinal direction.

The cone rolling device 15 has an elongate supporting frame 16 which is aligned horizontally and which extends over the entire length of the cone rolling device 15. The supporting frame 16 has two elongate horizontal rods 17, 18 which are disposed adjacent to one another and at the front end of the supporting frame 16 and at the rear end of the supporting frame 16 are interconnected by transverse pieces 19, 20.

The cone rolling device 15 is located between the two transport chains 21, 22 of an endless conveyor. The supporting frame 16 is fastened with the first cross-piece 19 located at the front end thereof on a chain member of the transport chain 21 and with the second cross-piece 20 located at the rear end thereof on a chain member of the transport chain 22.

The supporting frame 16 carries the rolling unit of the cone rolling device 15.

The rolling unit provides a horizontally aligned rolling mold 23, which is located on the front end of the cone rolling device 15. The rolling mold 23 is fastened to a cross-piece 24 of the supporting frame 16 which is located at a distance from the front end of the cone rolling device 15 and is rigidly connected to the two rods 17, 18 of the supporting frame 16. The rolling mold 23 is provided with a lateral (not shown) insertion slot for the wafer cakes. A sloping plate 23a is attached to the upper half of the rolling mold 23. The plate 23a forms a sliding path for the wafer cakes to be introduced through the insertion slot into the rolling mold 23.

The rolling unit provides a cone scraper 25 mounted in front of the rolling mold 23. This is located on a first carriage 26 which sits on the rods 17, 18 of the supporting frame 16 and is displaceable along the rods 17, 18 in the longitudinal direction of the supporting frame 16.

The rolling unit provides a horizontally aligned rolling mandrel 27 which can be inserted into the rolling mold 23. This is located on a second carriage 28 which sits on the rods 17, 18 of the supporting frame 16 and is displaceable along the rods 17, 18 in the longitudinal direction of the supporting frame 16. The rolling mandrel 27 is attached to the front end of a rolling mandrel shaft 29 which is rotatably mounted in a bearing block 30 located on the second carriage 28. A rolling mandrel drive wheel 31 is located at the rear end of the rolling mandrel shaft 29.

The cone scraper 25 is located on a front carriage part 26a of the first carriage 26. The first carriage 26 has a rear carriage part 26b located at a distance from the front carriage part 26a which is rigidly connected to the front carriage part 26a by a long horizontal spacer rod 26c.

The first carriage 26 is displaceable between a front end position (FIG. 6) adjacent to the rolling mold 23 and a rear end position (FIG. 5) adjacent to the rear end of the cone rolling device 15. In the rear end position, the first carriage 26 with the rear carriage part 26b abuts against a stop 32 which is located on the rear end of the cone rolling device 15 and is attached to the second cross-piece 20 of the supporting frame 16.

The front carriage part 26a of the first carriage 26 is located on the rods 17, 18 of the supporting frame 16 in front of the second carriage 28 and the rear carriage part 26b of the first carriage 26 is located on the rods 17, 18 after the second carriage 28. At the first carriage 26 the distance of the two carriage parts 26a and 26b and the length of the spacer rod 26c is approximately three times as great as the length of the second carriage 28. A horizontal longitudinal bore 28a is provided in the second carriage 28, in which the spacer rod 26c of the first carriage 26 is located.

The first carriage 26 is coupled to the second carriage 28 by a helical spring 33 located after the second carriage 28. The helical spring 33 is located on the spacer rod 26c of the first carriage 26. The helical spring 33 is supported on the rear side of the second carriage 28 and on the front side of the rear carriage part 26b of the first carriage 26. This coupling produces a rigid connection of the first carriage 26 to the second carriage 28. The first carriage 26 jointly makes every forward movement and backward movement of the second carriage 28 as long as the first carriage 26 has not reached its end position during a backward movement and abuts against the stop 32 with the rear carriage part 26b at the rear end of the cone rolling device 15. If the first carriage 26 abuts against the stop 32 and the second carriage 28 is pushed further backwards in the supporting frame 16, the second carriage 28 is then moved away from the front carriage part 26a of the first carriage 26 towards the rear, the helical spring 33 is axially compressed and the coupling between the first carriage 26 and the second carriage 28 is released. During the forward movement of the second carriage, this coupling is made again when the second carriage 28 impacts from behind against the front carriage part 26a of the first carriage 26 and pushes the first carriage 26 forwards away from the stop 32.

The second carriage 28 carries an entrainer 34 on its underside.

FIG. 5 shows the cone rolling device 15 with rolling unit pulled apart in the longitudinal direction. The first carriage 26 is located in its rear end position. The first carriage 26 abuts against the stop 32 with the rear carriage part 26b at the rear end of the cone rolling device 15. The second carriage 28 is also located in its rear end position and is located far behind the front carriage part 26a of the first carriage 26. The rolling mandrel 27 located on the second carriage 28 is located behind the cone scraper 25 located on the front carriage part 26a of the first carriage 26.

For pushing together the rolling unit the second carriage 28 is pushed forwards in the supporting frame 16.

In the first part of its forward movement the second carriage 28 is pushed forwards to the front carriage section 26a of the first carriage 26. In so doing the rolling mandrel 27 is pushed forwards through the cone scraper 25 and makes the coupling between the first carriage 26 and the second carriage 28.

In the second part of its forward movement, the second carriage 28 together with the first carriage 26 coupled to it is pushed further forwards. In so doing, the rolling mandrel 27 protruding forwards over the cone scraper 25 is inserted into the rolling mold 23.

FIG. 6 shows the cone rolling device 15 with rolling unit pushed together in the longitudinal direction. The first carriage 26 is located in its front end position. The cone scraper 25 is located in front of the rolling mold 23. The second carriage 28 is also located in its front end position. The rolling mandrel 27 projects through the cone scraper 25 into the rolling mold 23. The cone formed in the rolling mold 23 is located on the rolling mandrel 27. The cone scraper 25 is located behind the cone. The first carriage 26 is coupled to the second carriage 28 by the helical spring 33.

For pulling apart the rolling unit, the second carriage 28 is pushed towards the rear in the supporting frame 16.

In the first part of its backward movement the second carriage 28 entrains the first carriage 26 which is coupled to it. Both carriages 26 and 28 are pushed together backwards. The rolling mandrel 27 together with the cone is pulled out completely from the rolling mold 23 and the cone scraper 25 remains in its position behind the cone.

At the beginning of the second part of the backward movement of the second carriage 28, the first carriage 26 pushed backwards by the second carriage 28 impacts with its rear carriage part 26b against the stop 32 located at the rear end of the cone rolling device 15. As a result, the first carriage 26 is stopped in the cone rolling device 15 and the coupling between the first carriage 26 and the second carriage 28 is cancelled or released and the helical spring 33 is axially compressed.

In the second part of its backward movement the second carriage 28 is moved away from the front carriage part 26a of the first carriage 26 backwards to the rear carriage part 26b of the first carriage 26. In so doing the rolling mandrel 27 is pulled backwards through the cone scraper 25 located behind the cone and the cone scraper 25 scrapes the cone from the rolling mandrel 27. The cone drops downwards from the cone rolling device 15.

Figure 7A:
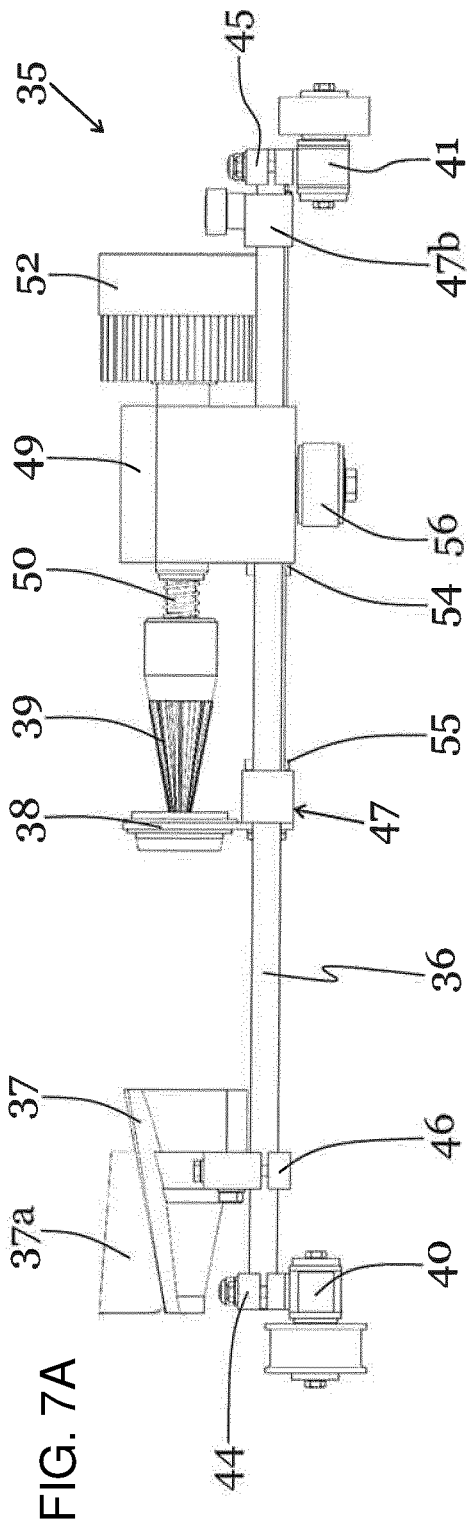
FIG. 7 shows another cone rolling device with pulled apart rolling unit, in FIG. 7a from the side, in FIG. 7b in longitudinal section and in FIG. 7c from above.
Figure 7B:
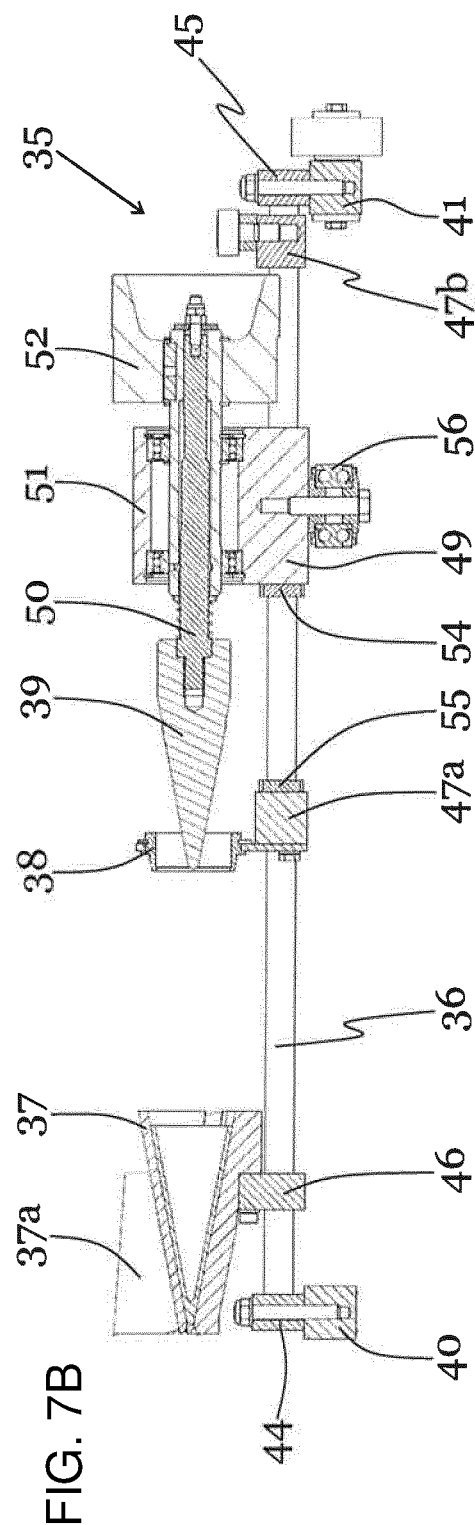
Figure 7C:
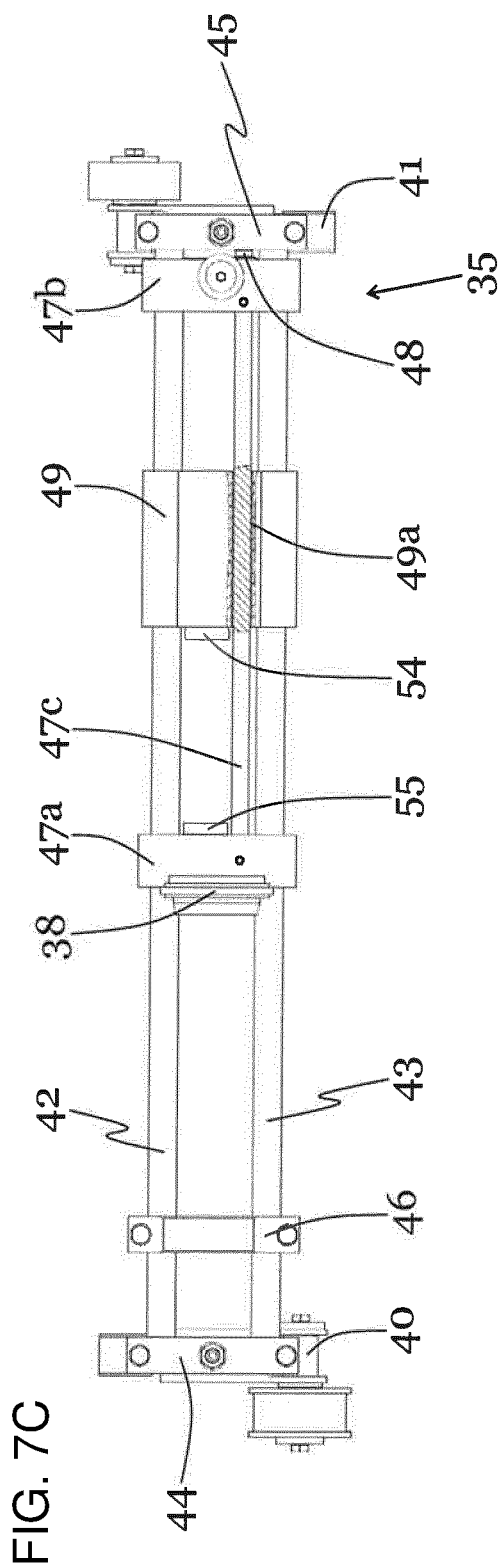
Figure 8A:
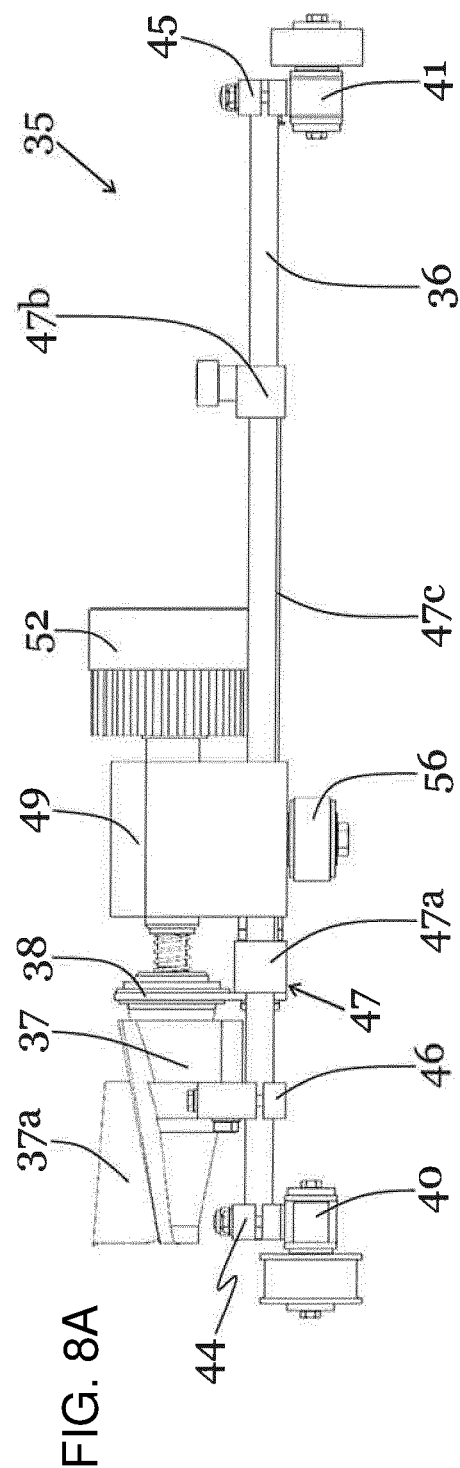
FIG. 8 shows the cone rolling device from FIG. 7 with closed rolling unit, in FIG. 8a from the side, in FIG. 8b in longitudinal section and in FIG. 8c from above.
Figure 8B:
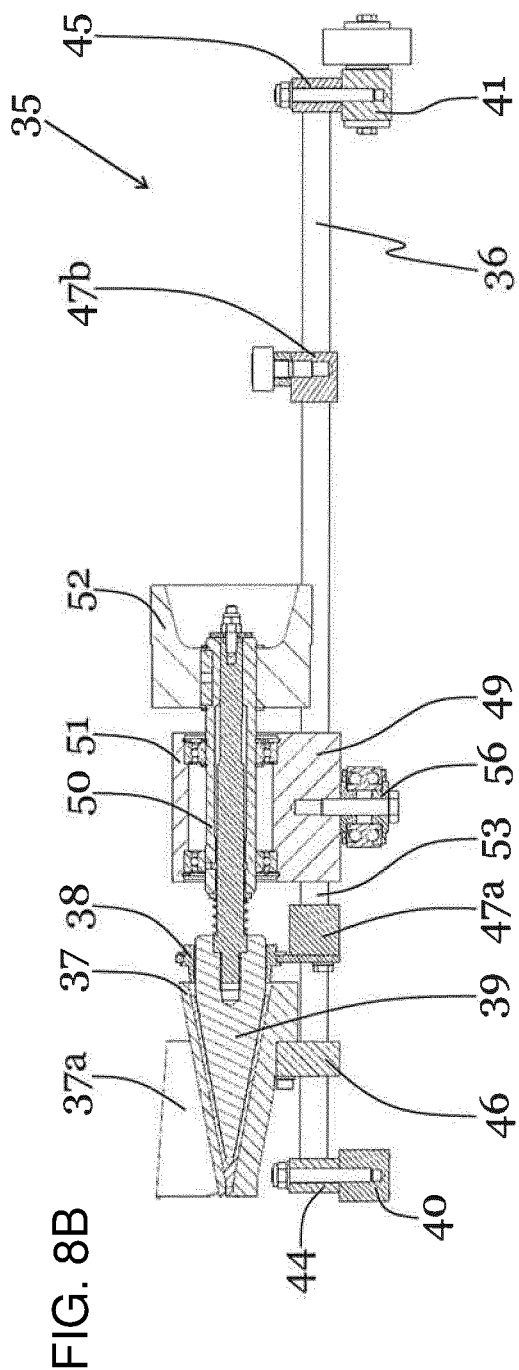
Figure 8C:
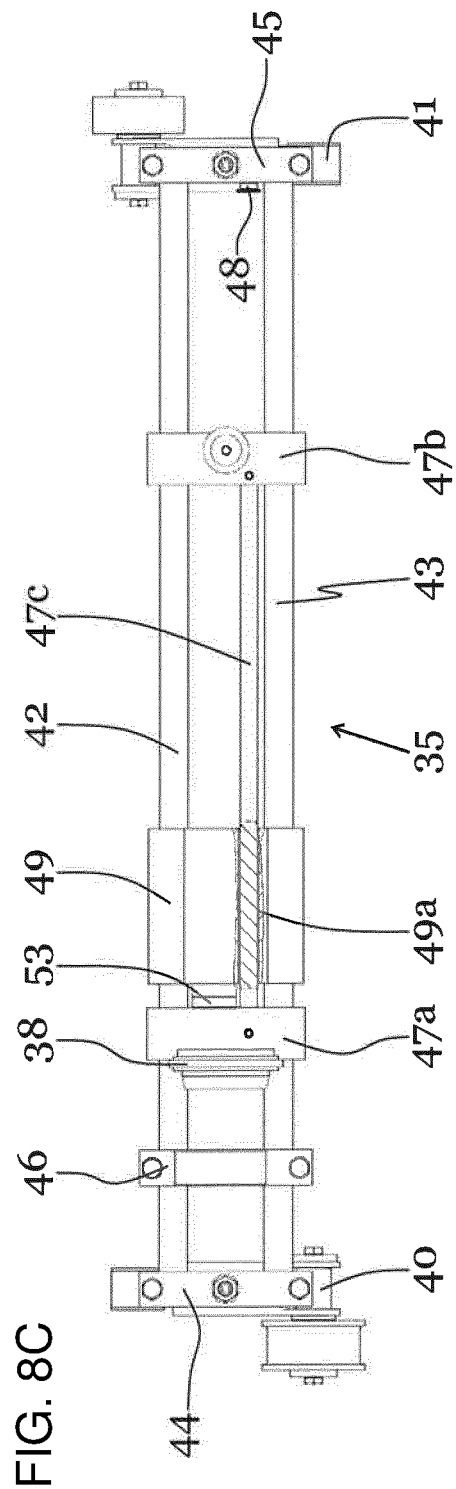

FIG. 7 shows another cone rolling device 35 with pulled apart rolling unit. FIG. 8 shows the cone rolling device 35 from FIG. 7 with pushed together rolling unit.

The cone rolling device 35 is horizontally aligned, It has an elongate horizontally aligned supporting frame 36 which extends over the entire length of the cone rolling device 35.

The supporting frame 36 carries the rolling unit of the cone rolling device 35 consisting of rolling mold 37, cone scraper 38 and rolling mandrel 39.

The cone rolling device 35 is disposed between the two transport chains 40, 41 of an endless conveyor and fastened with its supporting frame 36 on the two transport chains 40, 41.

The supporting frame 36 provides two adjacently disposed elongate horizontal rods 42, 43 which are rigidly connected to one another at both ends of the supporting frame 36 by two cross-pieces 44, 45. The first cross-piece 44 located at the front end of the supporting frame 36 is fastened to one chain member of the transport chain 40 and the second cross-piece 45 located at the rear end of the supporting frame 36 is fastened to one chain member of the transport chain 41.

The horizontally aligned rolling mold 37 is fastened to a third cross-piece 46 of the supporting frame 36 which is located at a distance from the front end of the cone rolling device 35 and is rigidly connected to both rods 42, 43 of the supporting frame 36. The rolling mold 37 is provided with a lateral insertion slot (not shown) for the wafer cakes. A sloping plate 37a is attached to the upper half of the rolling mold 37. The plate 37a forms a sliding path for the wafer cakes to be introduced through the insertion slot into the rolling mold 37.

The cone scraper 38 is located on a first carriage 47 which sits on the rods 42, 43 of the supporting frame 36 and is displaceable along the rods 42, 43 in the longitudinal direction of the supporting frame 36. The cone scraper 38 is located on the front carriage part 47a of the first carriage 47. The first carriage 47 has a rear carriage part 47b located at a distance from the front carriage part 47a which is rigidly connected by a long horizontal spacer rod 47c to the front carriage part 47a. The first carriage 47 is displaceable between a front end position (FIG. 8) adjacent to the rolling mold 37 and a rear end position (FIG. 7) adjacent to the rear end of the cone rolling device 35. In the rear end position the first carriage 47 with the rear carriage part 47b abuts against a stop 48 which is located at the rear end of the cone rolling device 35 and is attached to the second cross-piece 45 of the supporting frame 36.

The horizontally aligned rolling mandrel 39 is disposed on a second carriage 49 which sits on the rods 42, 43 of the supporting frame 36 and is displaceable along the rods 42, 43 in the longitudinal direction of the supporting frame 36. The rolling mandrel 39 is attached to the front end of the rolling mandrel shaft 50 which is rotatably mounted in a bearing block 51 located on the second carriage 49. A rolling mandrel drive wheel 52 is located at the rear end of the rolling mandrel shaft 50.

The front carriage part 47a of the first carriage 47 is located on the rods 42, 43 of the supporting frame 36 in front of the second carriage 49 and the rear carriage part 47b of the first carriage 47 is located on the rods 42, 43 behind the second carriage 49. In the first carriage 47 the spacing of the two carriage parts 47a and 47b and the length of the spacer rod 47c is approximately three times as great as the length of the second carriage 49. In the second carriage 49 a horizontal longitudinal bore 49a is provided in which the spacer rod 47c of the first carriage 47 is located.

A detachable binding member 53 is located between the front carriage part 47a of the first carriage 47 and the second carriage 49. The binding member 53 consists of a magnet 54 and a counter-piece 55. The magnet 54 is attached to the front side of the second carriage 49. The counter-piece 55 is attached to the rear side of the front carriage part 47a of the first carriage 47.

When the second carriage 49 abuts against the front carriage part 47a of the first carriage 47, the binding member 53 is closed and the first carriage 47 is coupled to the second carriage 49. The first carriage 47 jointly makes each forward movement and backward movement of the second carriage 49 as long as the binding member 53 is closed. When the first carriage 47 is located in its rear end position and the second carriage 49 is pushed further backwards in the supporting frame 36, the second carriage 49 then moves away from the front carriage part 47a of the first carriage 47 and the binding member 53 is released. When the second carriage 49 impacts from behind against the front carriage part 47a of the first carriage 47, the binding member 53 is closed again.

The second carriage 49 carries an entrainer 56 on its underside.

FIG. 7 shows the cone rolling device 35 with rolling unit pulled apart in the longitudinal direction. The first carriage 47 is located in its rear end position. The first carriage 47 abuts against the stop 48 with the rear carriage part 47b at the rear end of the cone rolling device 35. The second carriage 49 is also located in its rear end position and is located far behind the front carriage part 47a of the first carriage 47. The rolling mandrel 39 located on the second carriage 49 is located behind the cone scraper 38 located on the front carriage part 47a of the first carriage 47.

For pushing together the rolling unit, the second carriage 49 is pushed forwards in the supporting frame 36. Firstly the second carriage 49 is pushed forwards to the front carriage part 47a of the first carriage 47. In this case, the rolling mandrel 39 is pushed through the cone scraper 38 forwards and the binding member 53 is closed. Then the second carriage 49 pushes the first carriage 47 forwards. In so doing the rolling mandrel 39 projecting forwards over the cone scraper 38 is inserted into the rolling mold 37.

FIG. 8 shows the cone rolling device 35 with rolling unit pushed together in the longitudinal direction. The first carriage 47 is located in its front end position. The cone scraper 38 is located in front of the rolling mold 37. The second carriage 49 is also located in its front end position. The rolling mandrel 39 projects through the cone scraper 38 into the rolling mold 37. The cone formed in the rolling mold 37 is located on the rolling mandrel 39. The cone scraper 38 is located behind the cone. The binding member 53 is closed and the first carriage 47 is coupled to the second carriage 49 by the binding member 53.

For pulling apart the rolling unit the second carriage 49 is pushed backwards in the supporting frame 36.

In the first part of its backward movement, the second carriage 49 entrains the first carriage 47 coupled to it by the binding member 53. Both carriages 47 and 49 are pushed together towards the rear. The rolling mandrel 39 together with the cone is completely withdrawn from the rolling mold 37 and the cone scraper 38 remains in its position behind the cone.

At the beginning of the second part of the backward movement of the second carriage 49, the first carriage 47 pushed backwards by the second carriage 49 impacts with its rear carriage part 47b against the stop 48 located at the rear end of the cone rolling device 35. As a result the first carriage 47 is stopped in the cone rolling device 35 and the binding member 53 is released.

In the second part of its backward movement the second carriage 49 is moved away from the front carriage part 47a of the first carriage 47 backwards to the rear carriage part 47b of the first carriage 47. In so doing the rolling mandrel 39 is pulled backwards through the cone scraper 38 located behind the cone and the cone scraper 38 scrapes the cone from the rolling mandrel 39. The cone drops downwards from the cone rolling device 35.

Figure 9:
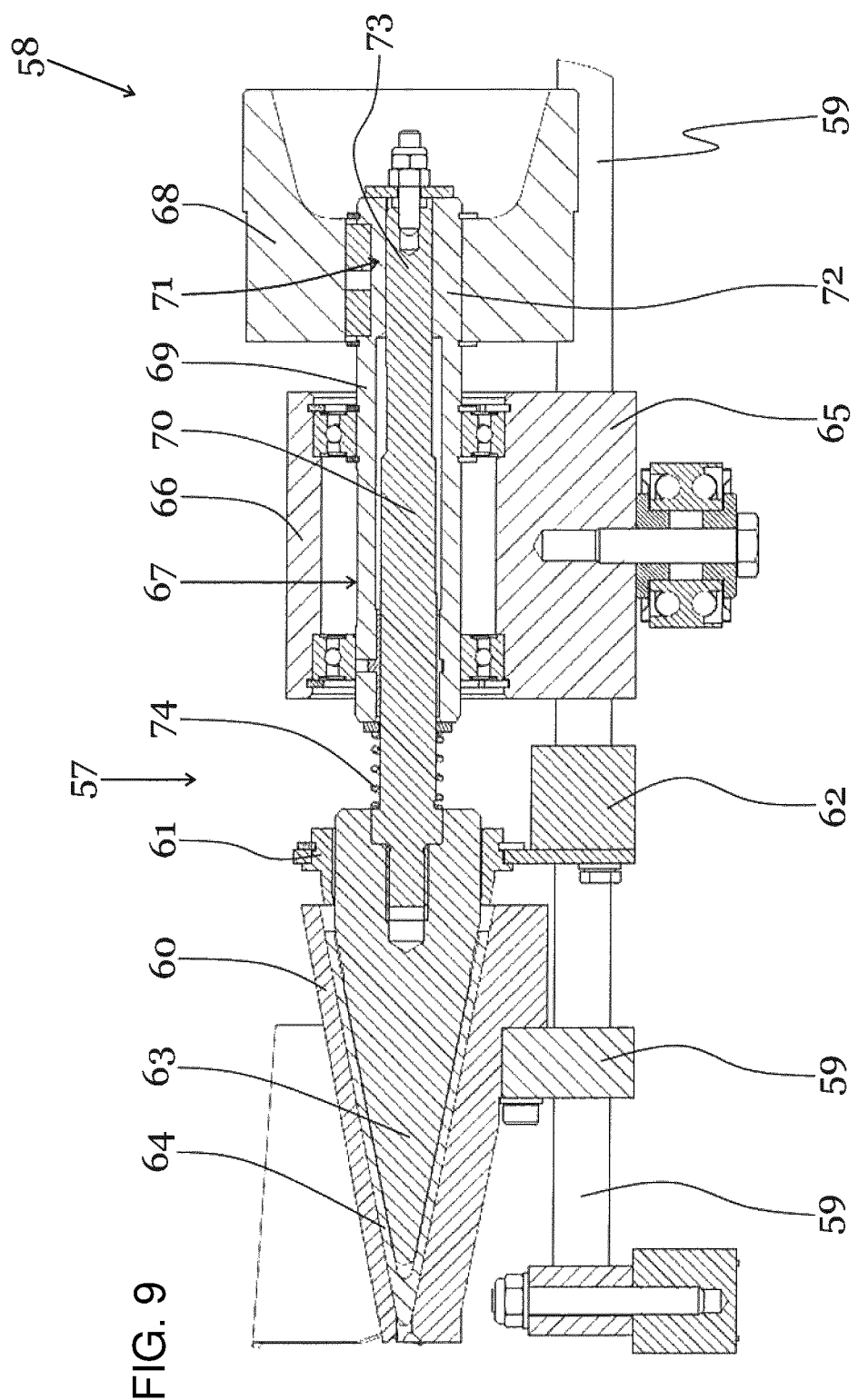
FIG. 9 shows a closed rolling unit of a cone rolling device in longitudinal section and FIG. 10 shows in a side view a machine frame with a guide device located along the circumferential path of the cone rolling devices assigned to the second carriage of the cone rolling devices.

FIG. 9 shows the rolling unit 57 of a cone rolling device 58 pushed together in the longitudinal direction. The cone rolling device 58 has a supporting frame 59 extending in the longitudinal direction of the cone rolling device 58. The rolling mold 60 is located at the front end of the cone rolling device 58 and is connected rigidly to the supporting frame 59. The cone scraper 61 is located in front of the rolling mold 60. The cone scraper 61 sits on a first carriage 62 which is displaceable along the supporting frame 59. The rolling mandrel 63 penetrates through the cone scraper 61 into the rolling mold 60. In the rolling mold 60 a cone 64 is located between the rolling mold 60 and the rolling mandrel 63. The rolling mandrel 63 is located on a second carriage 65 which is displaceable along the supporting frame 59.

The second carriage 65 is provided with a bearing block 66 in which a horizontally aligned rolling mandrel shaft 67 is rotatably mounted. The rolling mandrel 63 is located on the front end of the rolling mandrel shaft 67. The rolling mandrel drive wheel 68 is located at the rear end of the rolling mandrel shaft 67.

The rolling mandrel shaft 67 is configured as a rolling mandrel shaft which can be pushed together axially into itself.

The rolling mandrel shaft 67 provides an outer sleeve 69 which carries the rolling mandrel drive wheel 68 and is mounted rotatably but axially non-displaceably in the bearing block 66. The rolling mandrel shaft 67 provides an inner shaft 70 carrying the rolling mandrel 63 which is located in the interior of the outer sleeve 69 and is axially displaceable with respect to the outer sleeve 69. The rolling mandrel shaft 67 contains a polygonal coupling 71 which mechanically connects the outer sleeve 69 to the inner shaft 70, which is located in the rear part of the rolling mandrel shaft 67.

The polygonal coupling 71 provides an outer coupling section 72 formed by the rear end section of the outer sleeve 69, which is formed on the inner side as a polygonal sleeve. The polygonal coupling 71 provide an inner coupling section 73 formed by the rear end section of the inner shaft 70, which is formed on the outer side as a polygonal shaft. The inner coupling section 73 is received positively in the outer coupling section 72 and is displaceable in the longitudinal direction. The two coupling sections 72, 73 of the polygonal coupling 71 can be displaced with respect to one another during the torque transmission, i.e. under load.

At the second carriage 65 the torque introduced into the rolling mandrel shaft 67 by the rolling mandrel drive wheel 68 on the outer sleeve 69 is transmitted via the polygonal coupling 71 to the inner shaft 70 which is axially displaceable in the outer sleeve 69, which carries the rolling mandrel 63 at the front end. The rolling mandrel 63 can be moved horizontally to and fro in the second carriage 65 during the torque transmission without displacing the second carriage 65 itself. During the horizontal displacement of the rolling mandrel 63 only the rolling mandrel shaft is pushed together or pulled apart.

The second carriage 65 can remain in the front end position during rolling of a wafer cake even when an increase in the wall thickness of the resulting cone occurs during rolling of the wafer cake and the rolling mandrel 63 should draw back slightly in order not to flatten the wafer cake. This backwards movement of the rolling mandrel 63 taken up by the rolling mandrel shaft 67 which can be pushed together axially into itself. The inner shaft 70 carrying the rolling mandrel 63 is pushed back axially in the outer sleeve 69 carrying the rolling mandrel drive wheel 68. The torque transmission from the outer sleeve 69 to the inner shaft 70 is maintained unchanged by the polygonal coupling 71.

The rolling mandrel 63 is supported resiliently on the outer sleeve 69 of the rolling mandrel shaft 67 by a helical spring 74. The helical spring 74 is located on the inner shaft 70 between the end section of the inner shaft 70 carrying the rolling mandrel 63 and the front end of the outer sleeve 69.

The helical spring 74 determines the contact pressure with which the rolling mandrel 63 is pressed against the wafer cakes drawn into the rolling mold 60 during rolling into a cone. During withdrawal of the rolling mandrel 63 from the rolling mold 60, the helical spring 74 presses the rolling mandrel 63 back into its initial position.

In the machine 1 in FIGS. 1-4 the cone rolling devices 5 circulate in the longitudinal direction of the machine 1 and during this circulating movement the second carriages 13 in the cone rolling devices 5 are moved to and fro in the transverse direction of the machine 1 in order to pull apart or push together the rolling units of the cone rolling devices 5 in the longitudinal direction of the cone rolling devices 5.

The cone rolling devices 5 are conveyed by the endless conveyor 6 along the circumferential path from the input station 3 to the output station 7 and back again to the input station 3.

Before a cone rolling device 5 reaches the input station 3, its second carriage 13 is pushed forwards and its rolling unit is pushed together in the longitudinal direction. On passing the input station 3, the second carriage 13 is located in its front end position and the rolling unit 14 located on the second carriage 13 is set in rotation for rolling a wafer cake. After rolling the wafer cake, the cone rolling device 5 is conveyed to the output station 7. In the output station 7 the second carriage 13 is pushed backwards in order to pull apart the rolling unit in the longitudinal direction and output the cone from the cone rolling device 5.

The rolling mandrel 14 is located on the second carriage 13. The rolling mandrel 14 is located at the front end of a rolling mandrel shaft which is rotatably mounted in a bearing block located on the second carriage 13 and carries a rolling mandrel drive wheel 75 at the rear end. The rolling mandrel 14 is driven by means of the rolling mandrel drive wheel 75.

The first carriage 11 carrying the cone scraper 12 is co-moved passively with the second carriage 13 during displacement of the second carriage 13.

Figure 10:
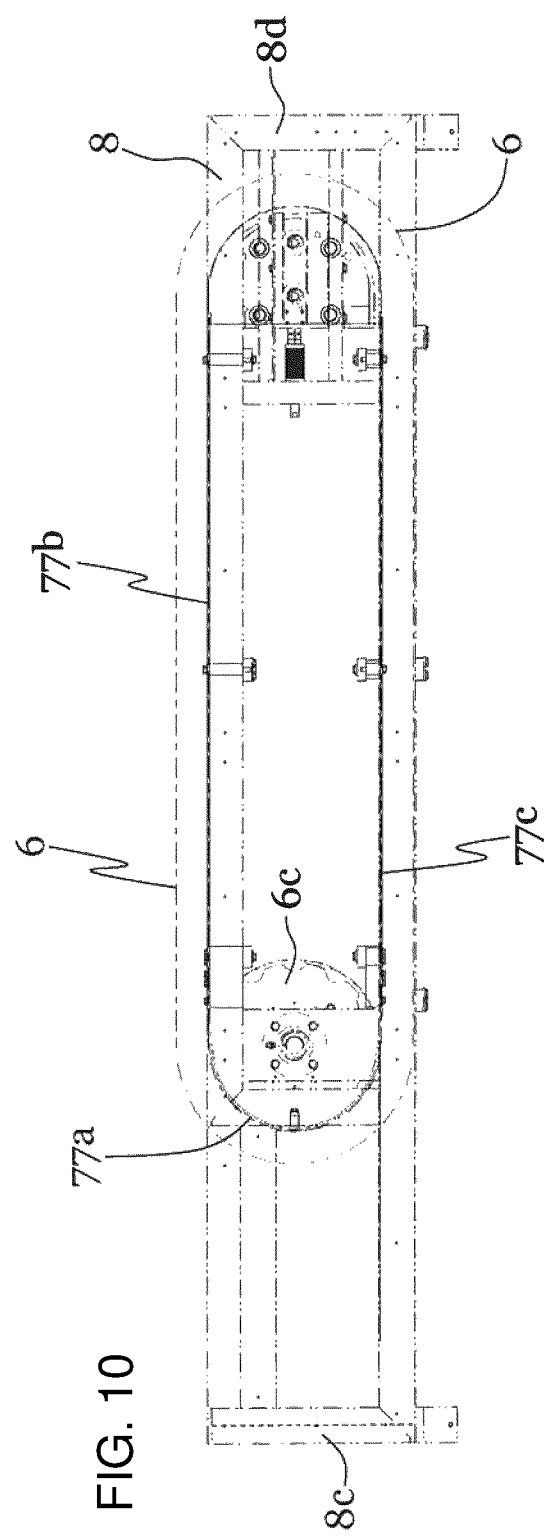

The second carriage 13 is moved to and fro in the longitudinal direction by means of an entrainer 76 attached to the underside in the supporting frame 9 of the cone rolling device 5. The entrainer 76 engages in a guide device 77 located along the circumferential path. The guide device in cooperation with the entrainer 76 controls the position of the second carriage 13 in the cone rolling device 5 whilst this is moved forwards by the endless conveyor 6 in the longitudinal direction of the machine frame 8. See on this matter also FIGS. 10 to 12.

As a result of the entrainer 76 engaging in the guide device 77, the second carriage 13 in the cone rolling device 5 is pushed forwards into its front end position, then held in the front end position and then pushed backwards into its rear end position.

The guide device 77 contains a first guide section 77a producing the forward movement of the second carriage 13, a second guide section 77b which holds the second carriage 13 in the front end position and a third guide section 77c producing the backwards movement of the second carriage 13.

The guide device 77 is located along the inner side of the circumferential path and at a distance from the circumferential path. The three guide sections 77a, 77b, 77c are located consecutively along the circumferential path. The guide device 77 provides two guide rails 78, 79 arranged parallel to one another between which the entrainers 76 attached to the second carriage 13 are disposed. The two guide rails 78, 79 are fastened to the machine frame 8.

The first guide section 77a is located on the circumferential path of the cone rolling devices 5 before the input station 3 of the machine 1. The first guide section 77a extends from the lower horizontal path section of the circumferential path along the front semicircular path section of the circumferential path to the upper horizontal path section of the circumferential path. In the first guide section 77a obliquely running arcuate guide rails 78a, 79a are provided in the machine frame 8. The guide rails 78a, 79a extend in the transverse direction of the machine frame 8 from the rear transport chain 6b of the endless conveyer 6 obliquely forwards to the front transport chain 6a of the endless conveyor 6.

When a cone rolling device 5 is conveyed in the longitudinal direction of the machine frame 8 through the front semicircular path section of the circumferential path, the second carriage 13 is pushed forwards through the entrainer 76 engaging in the first guide section 77a in the transverse direction of the machine frame 8 and the rolling unit of the cone rolling device 5 is pushed together in the longitudinal direction.

The second guide section 77b extends along the circumferential path from the input station 3 of the machine 1 up to the output station 7 of the machine 1. In the second guide section 77b guide rails 78b, 79b parallel to the longitudinal direction of the machine frame 8 are provided.

When a cone rolling device 5 is conveyed in the longitudinal direction of the machine frame 8 from the input station 3 to the output station 7, the second carriage 13 then remains in its front end position due to the entrainer 76 engaging in the second guide section 77a.

The third guide section 77c is located in the output station 7 located on the lower horizontal path section of the circumferential path. In the third guide section 77c flat guide rails 78c, 79c running obliquely in the machine frame 8 are provided. The guide rails 78c, 79c extend in the transverse direction of the machine frame 8 from the front transport chain 6a of the endless conveyor 6 obliquely backwards to the rear transport chain 6b of the endless conveyor 6.

When a cone rolling device 5 is conveyed in the longitudinal direction of the machine frame 8 through output station 7, the second carriage 13 is then pushed forwards through the entrainer 76 engaging in the third guide section 77c in the transverse direction of the machine frame 8 and the rolling unit of the cone rolling device 5 is pulled apart in the longitudinal direction and the cone drops downwards from the cone rolling device 5.

When the cone rolling devices 5 pass the input station 3 of the machine 1, the rolling mandrels 14 located on the second carriage 13 are set in rotation for rolling the wafer cakes. This is achieved by a drive device 80 fastened to the machine frame 8 which is located in the region of the input station 3. The drive device 80 provides a drive motor 81 which drives a belt drive 82. The belt drive 82 provides an endless belt 83 which extends in the longitudinal direction of the machine frame 8 and is located parallel to the circumferential path of the cone rolling devices 5. The belt 83 is located along the upper half of the front semicircular path section of the circumferential path and extends through the input station 3 as far as the upper horizontal path section of the circumferential path.

When a cone rolling device 5 passes the front semicircular path section of the circumferential path, the rolling mandrel drive wheel 75 comes into engagement with the belt 83 circulating in the longitudinal direction of the machine frame 8. The belt 83 drives the rolling mandrel 13 via the rolling mandrel drive wheel 75. The cone rolling device 5 is conveyed with rotating rolling mandrel 13 through the input station 3 of the machine 1. In the input station 3 a wafer cake is introduced via the sloping plate 10a into the rolling mold 10 and in the rolling mold 10 is rolled into a cone by the rotating rolling mandrel 13.

REFERENCE LIST

1. Machine
2. Underframe
3. Input station
4. Wafer cake
5. Cone rolling device
6. Endless conveyor
6a. Front transport chain
6b. Rear transport chain
6c. Deflecting wheels
6d. Deflecting wheel
6e. Drive shaft
7. Output station
8. Machine frame
8a. Front side wall
8b. Rear side wall
8c. Left end wall
8d. Right end wall
9. Supporting frame
10. Rolling mold
10a. Plate
11. First carriage [FIGS. 1-4]
12. Cone scraper
13. Second carriage [FIGS. 1-4]
14. Rolling mandrel
15. Cone rolling device [FIGS. 5, 6]
16. Supporting frame
17. Rods
18. Rods
19. First cross-piece
20. Second cross-piece
21. Transport chain
22. Transport chain
23. Rolling mold
23a. (Sloping) plate
24. Cross-piece
25. Cone scraper
26. First carriage
26a. Front carriage part
26b. Rear carriage part
26c. Spacer rod
27. Rolling mandrel
28. Second carriage
28a. (Horizontal) longitudinal bore
29. Rolling mandrel shaft
30. Bearing block
31. Rolling mandrel drive wheel
32. Stop 33. Helical spring
34. Entrainer
35. Cone rolling device [FIGS. 7-8]
36. Supporting frame
37. Rolling mold
37a. Plate
38. Cone scraper
39. Rolling mandrel
40. Transport chain
41. Transport chain
42. Rods
43. Rods
44. First cross-piece
45. Second cross-piece
46. Third cross-piece
47. First carriage
47a. Front carriage part
47b. Rear carriage part
47c. Spacer rod
48. Stop
49. Second carriage
49a. Longitudinal bore
50. Rolling mandrel shaft
51. Bearing block
52. Rolling mandrel drive wheel
53. Binding member
54. Magnet
55. Counterpiece
56. Entrainer
57. Rolling unit [FIG. 9]
58. Cone rolling device
59. Supporting frame
60. Rolling mold
61. Cone scraper
62. First carriage
63. Rolling mandrel
64. Cone
65. Second carriage
66. Bearing block
67. Rolling mandrel shaft
68. Rolling mandrel drive wheel
69. Outer sleeve
70. Inner shaft
71. Polygonal coupling
72. Outer coupling section
73. Inner coupling section
74. Helical spring
75. Rolling mandrel drive wheel [FIGS. 1-4]
76. Entrainer
77. Guide device
77a. First guide section
77b. Second guide section
77c. Third guide section
78. Guide rails
78a. Guide rails
78b. Guide rails
78c. Guide rails
79. Guide rails
79a. Guide rails
79b. Guide rails
79c. Guide rails
80. Drive device
81. Drive motor
82. Belt drive
83. Belt

The invention claimed is:

1. A machine, comprising:
horizontally aligned cone rolling devices for producing rolled wafer cones, said cone rolling devices each having a supporting frame;
an elongate machine frame in which said cone rolling devices are disposed consecutively along a circumferential path extending in a longitudinal direction of said elongate machine frame;
an input station;
an output station;
an endless conveyor disposed along the circumferential path and supporting said cone rolling devices, said endless conveyor conveying said cone rolling devices along the circumferential path from said input station disposed on a machine upper side to said output station disposed on a machine lower side, said endless conveyor having transport chains disposed on lateral edges of the circumferential path to which said elongate supporting frame of each of said cone rolling devices is affixed; and
each of said cone rolling devices having a rolling mold rigidly connected to said elongate supporting frame, a cone scraper being displaceable along said elongate supporting frame, a rolling mandrel being displaceable along said elongate supporting frame, a first carriage and a second carriage, said rolling mold disposed on a lateral end section of said supporting frame, said cone scraper is disposed on said first carriage being displaceable along said elongate supporting frame and said rolling mandrel is disposed on said second carriage which is displaceable along said elongate supporting frame.

2. The machine according to claim 1, wherein:
said second carriage has a bearing block; and
said rolling mandrel has a rolling mandrel drive wheel and a rolling mandrel shaft rotatably mounted in said bearing block on said second carriage, said rolling mandrel shaft carrying said rolling mandrel at a front end and said rolling mandrel drive wheel at a rear end.

3. The machine according to claim 2, wherein said rolling mandrel shaft is configured as a rolling mandrel shaft which can be pushed together axially into itself, wherein said rolling mandrel shaft has an outer sleeve which is mounted rotatably but axially non-displaceably in said bearing block, and carries said rolling mandrel drive wheel, an inner shaft which is axially displaceably in said outer sleeve and which carries said rolling mandrel, and a polygonal coupling which mechanically connects said outer sleeve with said inner shaft.

4. The machine according to claim 3, wherein:
said polygonal coupling is disposed in a rear part of said rolling mandrel shaft;
said outer sleeve defining an outer coupling section having an inner side formed as a polygonal sleeve, said outer coupling section forming part of said polygonal coupling; and
said inner shaft defining an inner coupling section having an outer side functioning as a polygonal shaft, said inner coupling section is received form-fitting in said outer coupling section, said inner coupling section forming part of said polygonal coupling.

5. The machine according to claim 3, wherein said rolling mandrel is fastened on said inner shaft of said rolling mandrel shaft and is supported resiliently on said outer sleeve of said rolling mandrel shaft.

6. The machine according to claim 5, further comprising a helical spring, said rolling mandrel fastened on said inner shaft of said rolling mandrel shaft is resiliently supported by means of said helical spring on said outer sleeve of said rolling mandrel shaft.

7. The machine according to claim 6, wherein said helical spring is disposed between a rear side of said rolling mandrel and a front end of said outer sleeve of said rolling mandrel shaft.

8. The machine according to claim 7, wherein said helical spring is disposed between a front end section of said inner shaft of said rolling mandrel shaft which carries said rolling mandrel and said front end of said outer sleeve of said rolling mandrel shaft.

9. The machine according to claim 1,
further comprising a guide device disposed along the circumferential path in said elongate machine frame; and
wherein said second carriage carrying said rolling mandrel has an entrainer which can be brought into engagement with said guide device disposed along the circumferential path in said elongate machine frame, said guide device together with said entrainer controls a position of said second carriage in said cone rolling device.

10. The machine according to claim 9, wherein:
said guide device has two guide rails disposed parallel to one another, between which said entrainer attached to said second carriage is disposed;
said guide device has a first guide section mounted in front of said input station and has obliquely running guide rails disposed in said elongate machine frame, said first guide section together with said entrainer attached to said second carriage produces a forwards movement of said second carriage which introduces said rolling mandrel into said rolling mold; and
said guide device has a second guide section disposed in an area of said output station, said second guide section having guide rails running obliquely in said elongate machine frame and together with said entrainer attached to said second carriage produces a backwards movement of said second carriage which withdraws said rolling mandrel from said rolling mold.

11. The machine according to claim 1,
wherein said first carriage can be moved passively with said second carriage;
wherein said first carriage has a spacer rod, a front carriage part which is disposed in front of said second carriage and carries said cone scraper and a rear carriage part disposed behind said second carriage;
wherein said front carriage part is disposed at a distance from said rear carriage part and is rigidly connected to said rear carriage part by said spacer rod;
further comprising a helical spring, said first carriage is coupled to said second carriage by said helical spring disposed behind said second carriage; and
further comprising a stop, at a rear end of said supporting frame said stop is disposed for delimiting a displacement path of said first carriage.

12. The machine according to claim 1,
wherein said first carriage can be moved passively with said second carriage;
wherein said first carriage has a front carriage part disposed in front of said second carriage and carries said cone scraper and a rear carriage part disposed behind said second carriage;
further comprising a spacer rod;
said front carriage part is disposed at a distance from said rear carriage part and is rigidly connected to said rear carrier part by said spacer rod;
further comprising a detachable binding member, said first carriage is coupled to said second carriage by said detachable binding member; and
further comprising a stop, at a rear end of said supporting frame said stop is disposed for delimiting a displacement path of said first carriage.

13. The machine according to claim 12, further comprising a detachable binding member, said first carriage is coupled to said second carriage by said detachable binding member, said detachable binding member includes a magnet attached to a front side of said second carriage and a counterpiece attached to a rear side of said front carriage part of said first carriage.

* * * * *